US012393271B2

(12) United States Patent
Abele et al.

(10) Patent No.: US 12,393,271 B2
(45) Date of Patent: *Aug. 19, 2025

(54) ENHANCED EYE TRACKING FOR AUGMENTED OR VIRTUAL REALITY DISPLAY SYSTEMS

(71) Applicant: Magic Leap, Inc., Plantation, FL (US)

(72) Inventors: Nicolas Abele, Lausanne (CH); Eric Chevallaz, Pompaples (CH); Philippe De Gol, Muraz (CH); Julien Gamet, Saint Point Lac (FR); Gatien Cosendey, Belmont-sur-Lausanne (CH); Stephan Arthur Gamper, Lausanne (CH)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/736,908

(22) Filed: Jun. 7, 2024

(65) Prior Publication Data
US 2024/0319790 A1 Sep. 26, 2024

Related U.S. Application Data

(63) Continuation of application No. 18/309,787, filed on Apr. 29, 2023, now Pat. No. 12,039,099, which is a (Continued)

(51) Int. Cl.
G06F 3/01 (2006.01)
G02B 26/10 (2006.01)
(Continued)

(52) U.S. Cl.
CPC ........... *G06F 3/013* (2013.01); *G02B 26/101* (2013.01); *G02B 27/0093* (2013.01);
(Continued)

(58) Field of Classification Search
CPC . G06F 3/013; G02B 27/0172; G02B 27/0093; G02B 27/0927; G02B 27/0944;
(Continued)

(56) References Cited

U.S. PATENT DOCUMENTS 6,850,221 B1    2/2005  Tickle
11,681,362 B2 *  6/2023  Abele ................ G02B 26/0808
                                                    359/569

(Continued)

FOREIGN PATENT DOCUMENTS

EP      3462382 A1    4/2019
WO    2018186046 A1   10/2018
WO    2021108327 A1    6/2021

OTHER PUBLICATIONS

ARToolKit: https://web.archive.org/web/20051013062315/http://www.hitl.washington.edu:80/artoolkit/documentation/hardware.htm, archived Oct. 13, 2005.

(Continued)

*Primary Examiner* — Xuemei Zheng
(74) *Attorney, Agent, or Firm* — Tobias Intellectual Property Law, PLLC

(57) ABSTRACT

Techniques are described for enhanced eye tracking for display systems, such as augmented or virtual reality display systems. The display systems may include a light source configured to output light, a moveable diffractive grating configured to reflect light from the light source, the reflected light forming a scan pattern on the eye of the user, and light detectors to detect light reflected from the eye. The orientation of the diffractive grating can be moved such that the light reflected from the diffractive grating is scanned across the eye according to the scan pattern. Light intensity pattern(s) are obtained via the light detectors, with a light intensity pattern representing a light detector signal obtained by detecting light reflected by the eye as the light is scanned (Continued)

across the eye. One or more physiological characteristics and/or a rotation speed of the eye are determined based on detected light intensity pattern(s).

20 Claims, 33 Drawing Sheets

Related U.S. Application Data continuation of application No. 17/102,326, filed on Nov. 23, 2020, now Pat. No. 11,681,362.

(60) Provisional application No. 62/940,785, filed on Nov. 26, 2019.

(51) Int. Cl.
    G02B 27/00    (2006.01)
    G02B 27/01    (2006.01)
    G02B 27/09    (2006.01)

(52) U.S. Cl.
CPC ..... *G02B 27/0172* (2013.01); *G02B 27/0927* (2013.01); *G02B 27/0944* (2013.01); *G02B 27/0977* (2013.01)

(58) Field of Classification Search
CPC ............. G02B 27/0977; G02B 26/101; G02B 26/0833; G02B 26/0808
See application file for complete search history.

(56) References Cited

U.S. PATENT DOCUMENTS

| | | | |
|---|---|---|---|
| 12,039,099 B1* | 7/2024 | Abele | G02B 26/0808 |
| 2002/0041259 A1 | 4/2002 | Lewis et al. | |
| 2006/0028436 A1 | 2/2006 | Armstrong | |
| 2007/0081123 A1 | 4/2007 | Lewis | |
| 2012/0127062 A1 | 5/2012 | Bar-Zeev et al. | |
| 2012/0162549 A1 | 6/2012 | Gao et al. | |
| 2013/0082922 A1 | 4/2013 | Miller | |
| 2013/0117377 A1 | 5/2013 | Miller | |
| 2013/0120712 A1* | 5/2013 | Spasovski | A61B 3/113 351/209 |
| 2013/0125027 A1 | 5/2013 | Abovitz | |
| 2013/0208234 A1 | 8/2013 | Lewis | |
| 2013/0242262 A1 | 9/2013 | Lewis | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0267420 A1 | 9/2014 | Schowengerdt et al. | |
| 2015/0016777 A1 | 1/2015 | Abovitz et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0271478 A1 | 9/2015 | Zhou | |
| 2015/0309263 A2 | 10/2015 | Abovitz et al. | |
| 2015/0326570 A1 | 11/2015 | Publicover et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0217327 A1 | 7/2016 | Osterhout et al. | |
| 2017/0115483 A1 | 4/2017 | Aleem et al. | |
| 2017/0276934 A1* | 9/2017 | Sarkar | G01B 11/002 |
| 2017/0285735 A1 | 10/2017 | Young et al. | |
| 2017/0332899 A1 | 11/2017 | Walsh et al. | |
| 2018/0008141 A1 | 1/2018 | Krueger | |
| 2018/0174309 A1 | 6/2018 | Hoshino | |
| 2018/0278924 A1 | 9/2018 | Schowengerdt et al. | |
| 2018/0314416 A1 | 11/2018 | Powderly et al. | |
| 2018/0335629 A1 | 11/2018 | Cheng et al. | |
| 2019/0004322 A1 | 1/2019 | Alexander et al. | |
| 2019/0011703 A1 | 1/2019 | Robaina et al. | |
| 2019/0012540 A1 | 1/2019 | Trail | |
| 2019/0018481 A1 | 1/2019 | Aleem et al. | |
| 2019/0018485 A1 | 1/2019 | Aleem et al. | |
| 2019/0019448 A1 | 1/2019 | Pappas | |
| 2019/0094981 A1 | 3/2019 | Bradski et al. | |
| 2019/0138094 A1 | 5/2019 | Miettinen et al. | |
| 2019/0204912 A1 | 7/2019 | Yang et al. | |
| 2019/0243448 A1 | 8/2019 | Miller et al. | |
| 2020/0033590 A1 | 1/2020 | Katsuyama et al. | |
| 2020/0257113 A1 | 8/2020 | Bednarik et al. | |
| 2021/0157401 A1 | 5/2021 | Abele et al. | |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/ azuma/ARpresence.pdf.

Azuma, "Predictive Tracking for Augmented Realty," TR95-007, Department of Computer Science, UNC—Chapel Hill, NC, Feb. 1995.

Bimber, et al., "Spatial Augmented Reality—Merging Real and Virtual Worlds," 2005 https://web.media.mit.edu/raskar/book/BimberRaskarAugmentedRealityBook.pdf.

EP20894738.2 Extended European Search Report dated Nov. 28, 2023.

International Preliminary Report on Patentability for PCT Application No. PCT/US2020/061860, dated May 17, 2022.

International Search Report and Written Opinion for PCT Application No. PCT/US2020/061860, dated Feb. 9, 2021.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. AMC CHI 2000 Human Factors in Computing Systems Conference, pp. 265-272, Addison-Wesley/ACM Press (2000).

* cited by examiner

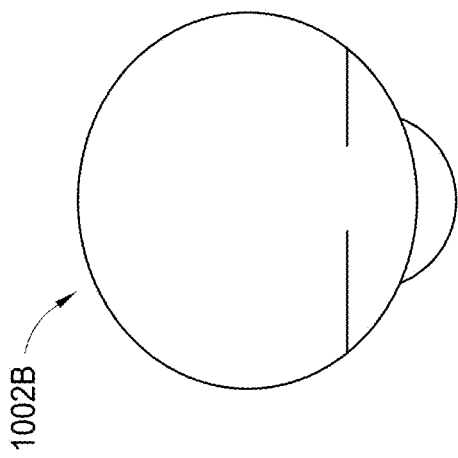
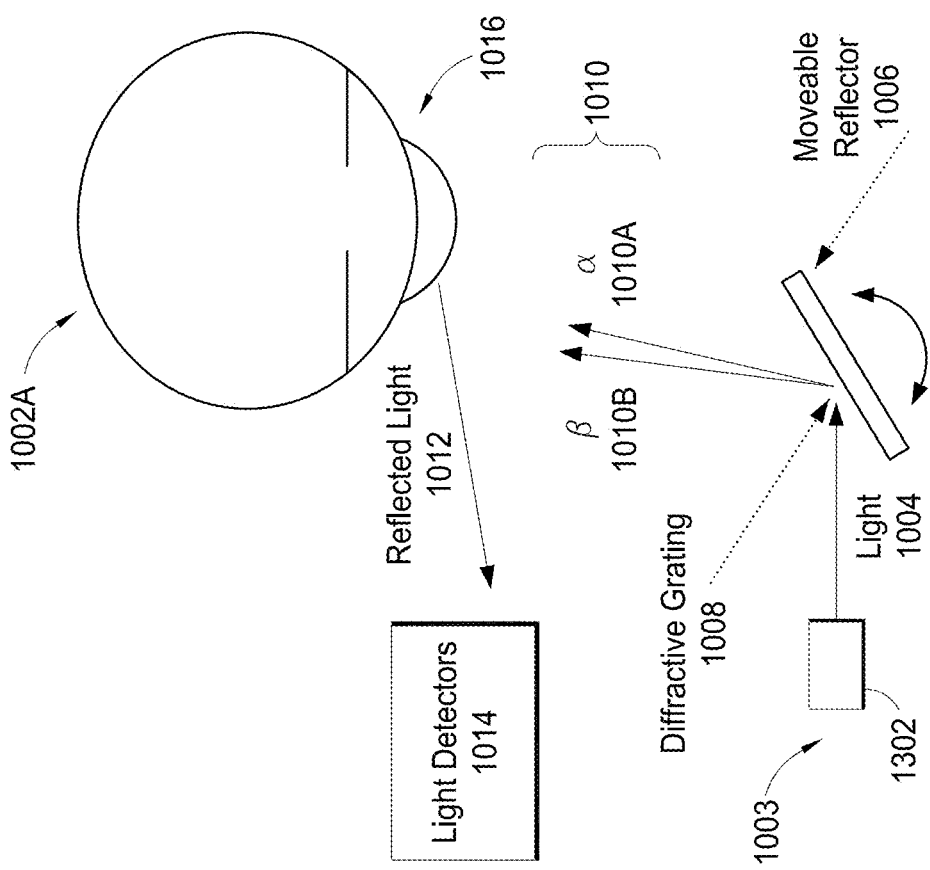
FIG. 10A

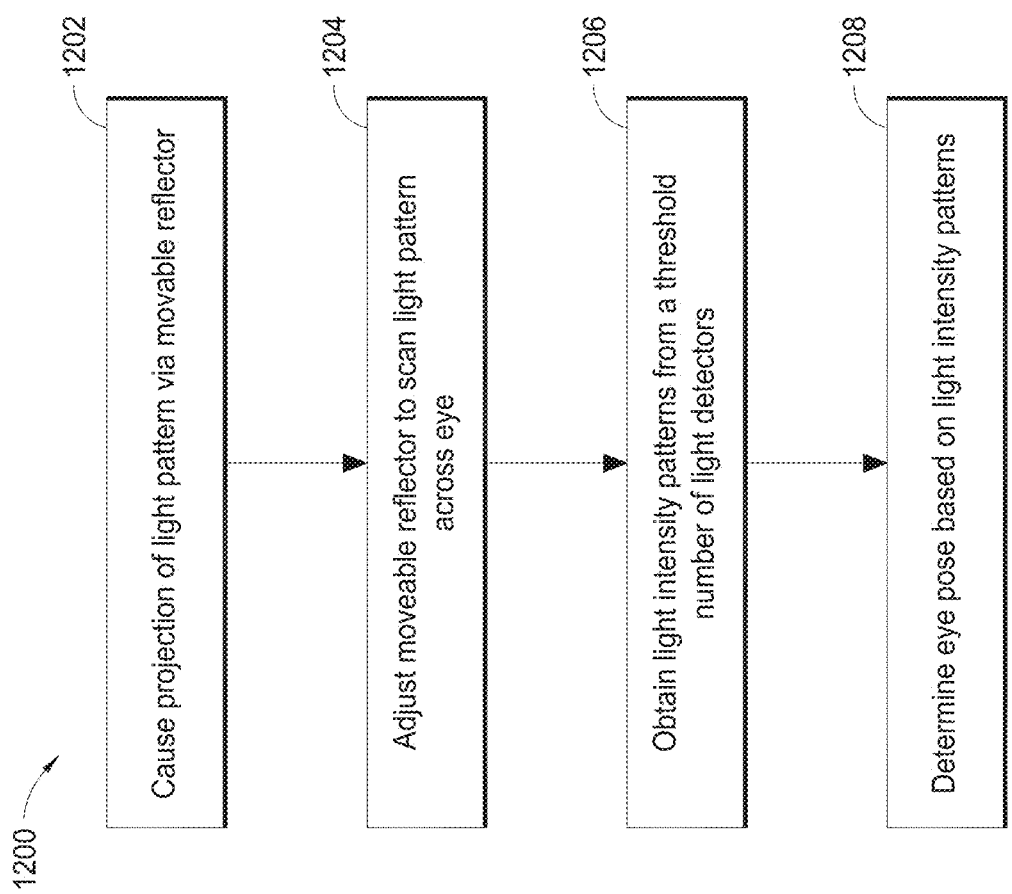

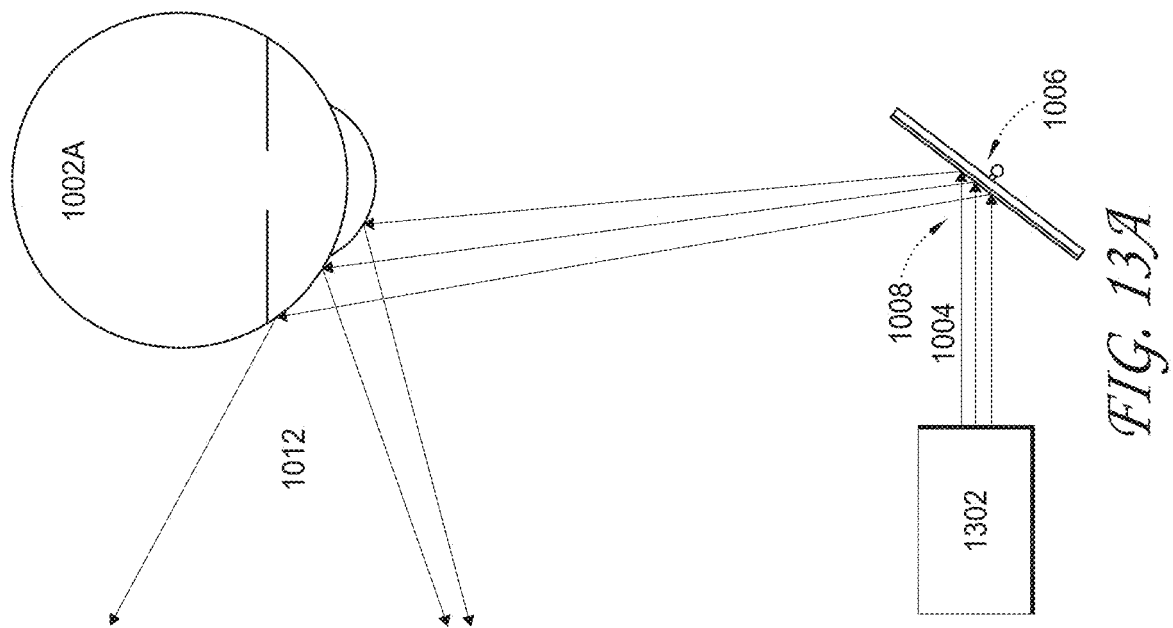

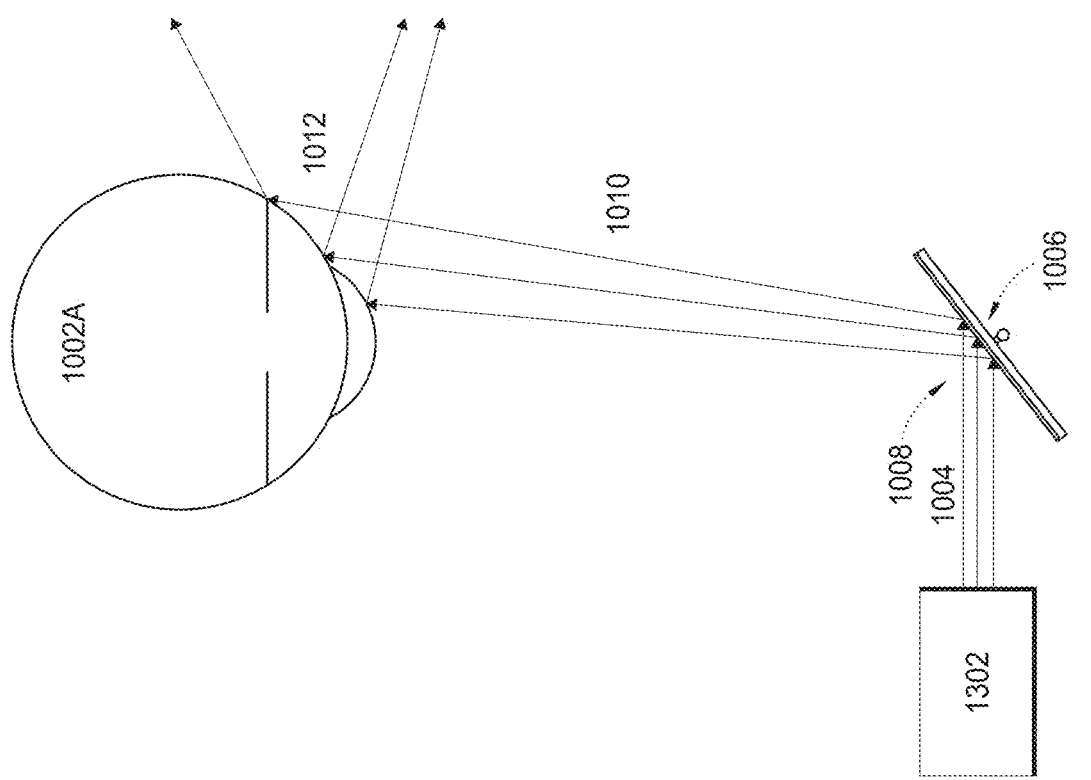

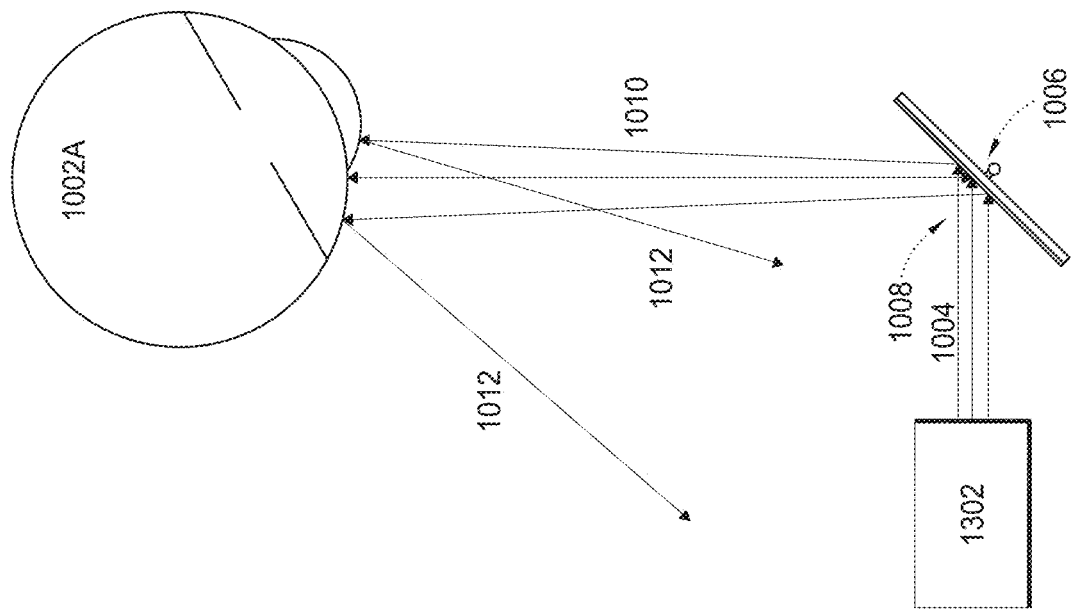

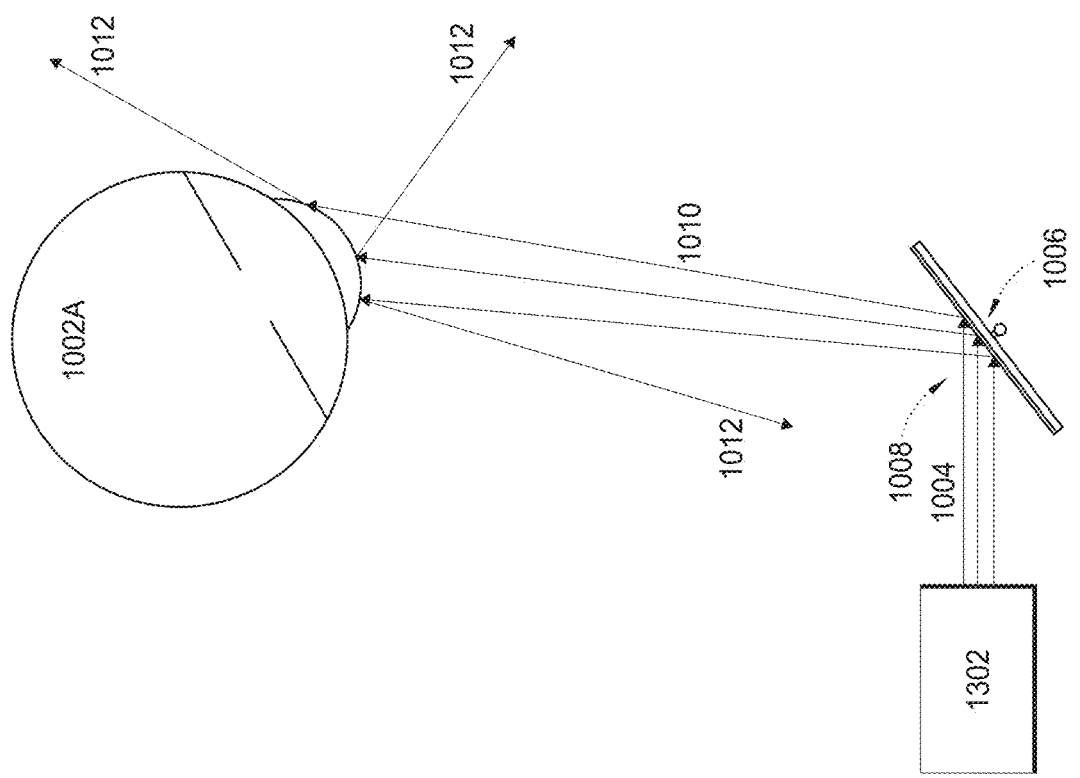

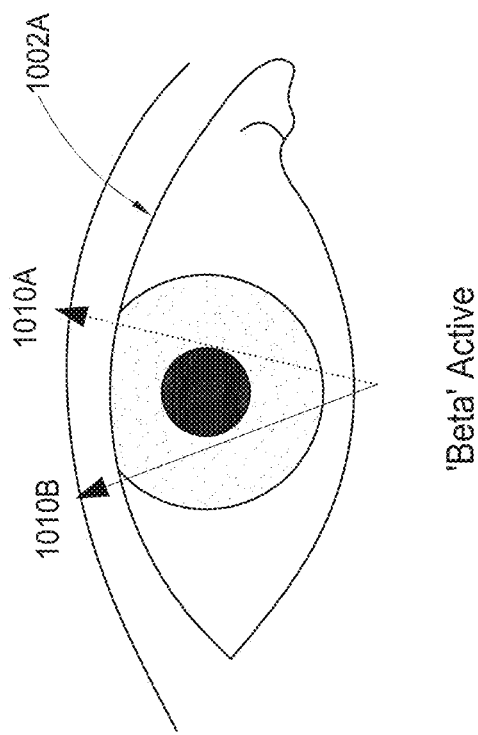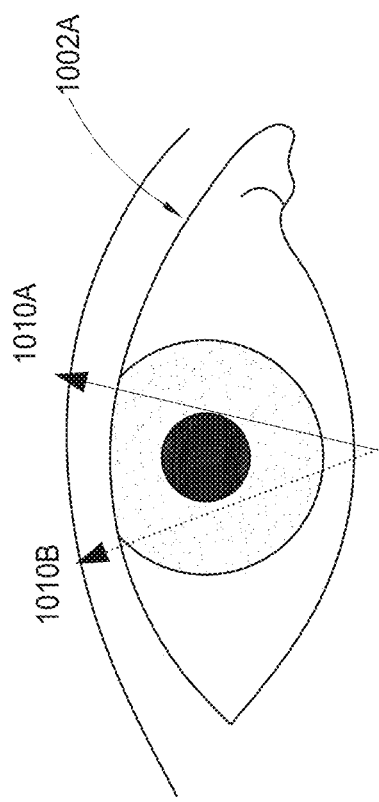
FIG. 17A

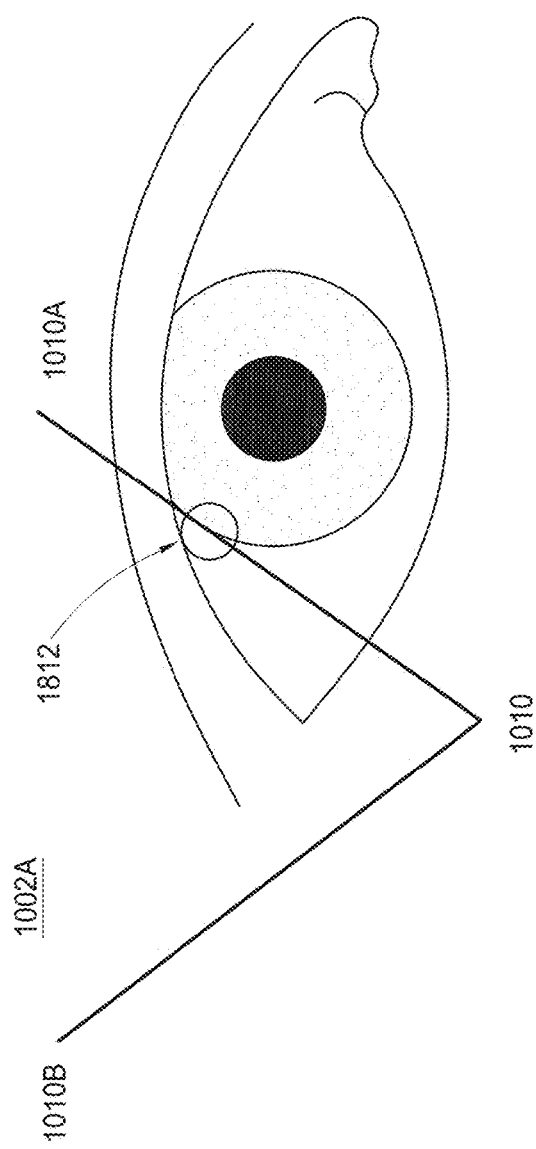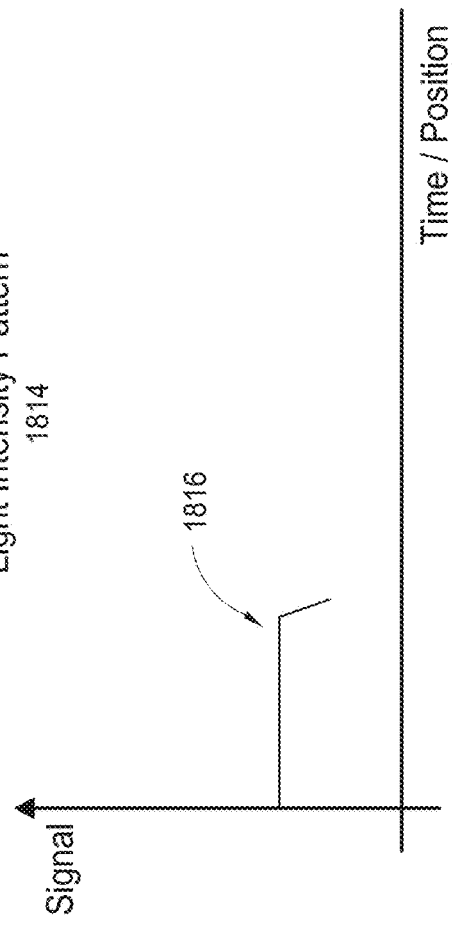
FIG. 18B

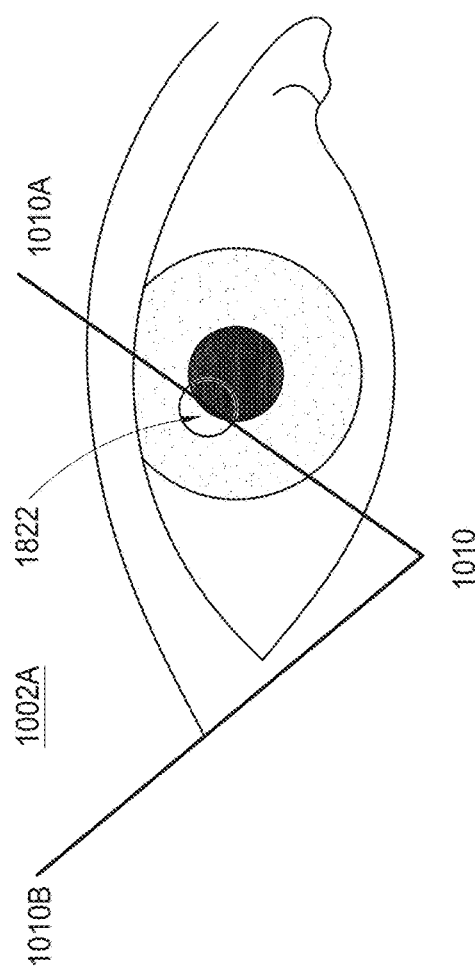
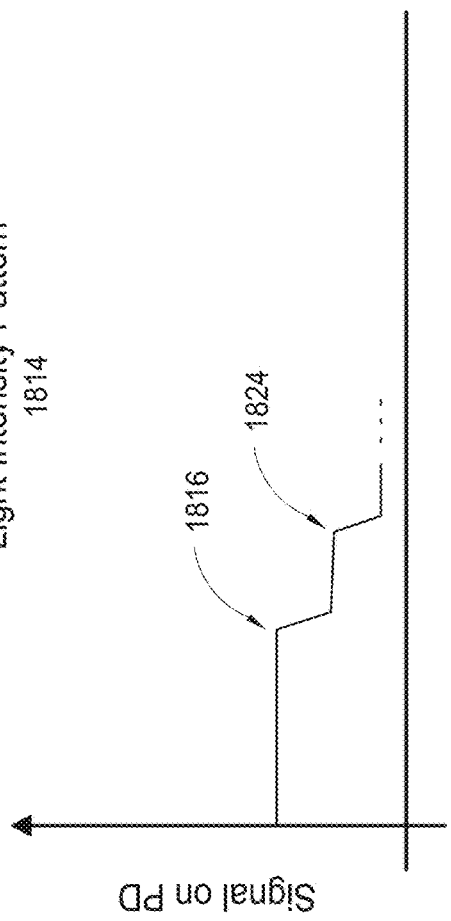
FIG. 18C

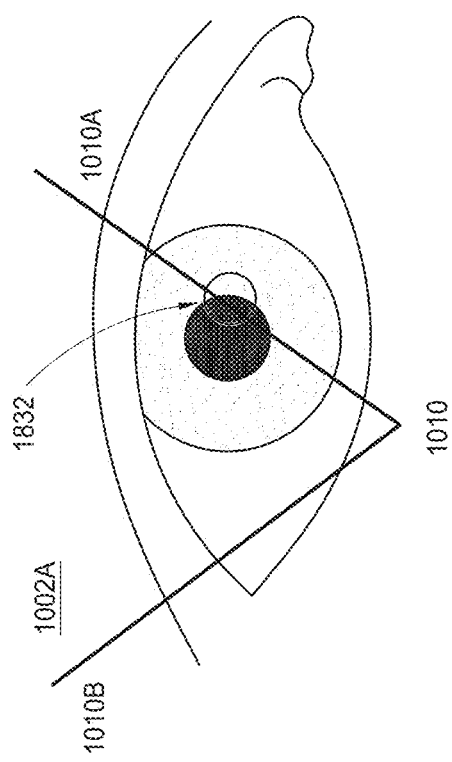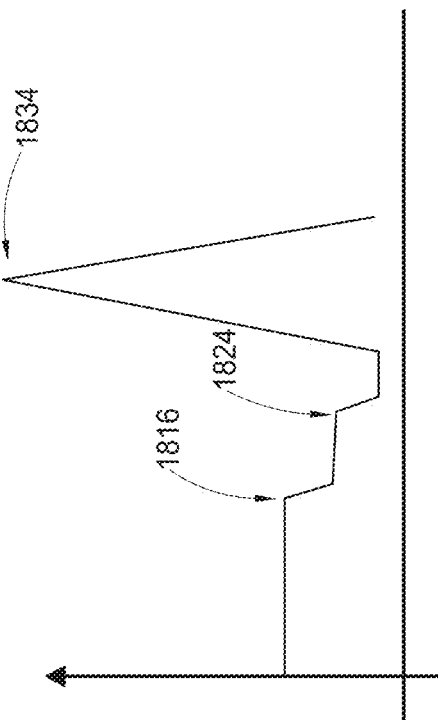
FIG. 18D

ENHANCED EYE TRACKING FOR AUGMENTED OR VIRTUAL REALITY DISPLAY SYSTEMS

PRIORITY CLAIM

This application is a continuation of U.S. application Ser. No. 18/309,787, filed Apr. 29, 2023, which is a continuation of U.S. application Ser. No. 17/102,326, filed Nov. 23, 2020, which claims benefit of priority to U.S. Provisional Application No. 62/940,785, filed Nov. 26, 2019. The entire contents of each of the above-listed applications are hereby incorporated by reference into this application.

INCORPORATION BY REFERENCE

This application incorporates by reference the entirety of U.S. application Ser. No. 15/469,369, filed on Mar. 24, 2017 and published on Sep. 28, 2017 as U.S. Patent Application Publication No. 2017/0276948.

BACKGROUND

Field

The present disclosure relates to display systems and, more particularly, to augmented and virtual reality display systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to display technology, including AR and VR technology.

SUMMARY

In some embodiments, a display system configured to present virtual content to a user is provided. The display system comprises a light source configured to output light, a movable reflector configured to reflect the outputted light to the eye of the user to scan a pattern formed of the light across the eye, a plurality of light detectors configured to detect reflections of the light scanned across the eye, and one or more processors configured to perform operations. The operations comprise causing adjustment of the orientation of the moveable reflector, such that the reflected light is scanned across the eye. Respective light intensity patterns are obtained via the light detectors, wherein a light intensity pattern represents light detector signals at different times and the light detector signals are obtained during scanning of the reflected light across the eye. An eye pose of the eye is determined based on the light intensity patterns, the eye pose representing an orientation of the eye.

In some embodiments, a method implemented by a display system of one or more processors is provided. The display system is configured to present virtual content to a user based, at least in part, on an eye pose of an eye of the user. The method comprises adjusting a position of a light pattern directed onto the eye, such that the light pattern moves across the eye. A plurality of light intensity patterns are obtained, the light intensity patterns representing light detector signals at different times, the light detector signals obtained from respective light detectors during adjustment of the position of the light pattern. The eye pose of the eye is determined based on the light intensity patterns, the eye pose representing an orientation of the eye.

In some embodiments, non-transitory computer storage media is provided. The non-transitory computer storage media storing instructions that when executed by a display system of one or more processors, cause the one or more processors to perform operations. The operations comprise adjusting a position of a light pattern directed onto the eye, such that the light pattern moves across the eye. A plurality of light intensity patterns are obtained, the light intensity patterns representing light detector signals at different times, the light detector signals obtained from respective light detectors during adjustment of the position of the light pattern. The eye pose of the eye is determined based on the light intensity patterns, the eye pose representing an orientation of the eye.

In some embodiments, a display system configured to present virtual content to a user is provided. The display system comprises a light source configured to output light, a movable reflector configured to reflect the outputted light to the eye of the user to scan a pattern formed of the light across the eye, a plurality of light detectors configured to detect reflections of the light scanned across the eye, and one or more processors configured to perform operations. The operations comprise obtaining, via the light detectors, respective light intensity patterns, wherein a light intensity pattern represents light detector signals at different times, the light detector signals obtained during scanning of the reflected light across the eye. One or both of a size and position of a physiological feature of the eye is determined based on the light intensity patterns.

Additional examples of embodiments are provided below.

Example 1. A display system configured to present virtual content to a user, the display system comprising: a light source configured to output light; a movable reflector configured to reflect the outputted light to the eye of the user to scan a pattern formed of the light across the eye; a plurality of light detectors configured to detect reflections of the light scanned across the eye; and one or more processors configured to perform operations comprising: causing adjustment of the orientation of the moveable reflector, such that the reflected light is scanned across the eye; obtaining, via the light detectors, respective light intensity patterns, wherein a light intensity pattern represents light detector signals at different times, the light detector signals being obtained during scanning of the reflected light across the eye; and determining, based on the light intensity patterns, an eye pose of the eye, the eye pose representing an orientation of the eye.

Example 2. The display system of example 1, wherein the light source is a diode.

Example 3. The display system of example 2, wherein the diode is a vertical-cavity surface-emitting laser.

Example 4. The display system of example 1, wherein the movable reflector comprises a diffractive grating, wherein the diffractive grating is configured to convert an incident beam of light from the light source into a light pattern comprising multiple lines of light spanning an area of the eye.

Example 5. The display system of example 1, wherein the movable reflector comprises a diffractive grating, wherein the diffractive grating is configured to convert an incident beam of light from the light source into a light pattern comprising multiple beams of light.

Example 6. The display system of example 1, wherein the movable reflector comprises a plurality of diffractive gratings, each diffractive grating configured to form a different light pattern for scanning across the eye.

Example 7. The display system of example 1, wherein the movable reflector is a microelectromechanical systems (MEMS) mirror.

Example 8. The display system of example 1, wherein the light detectors are photodiodes, and wherein each light intensity pattern represents a plot of electrical current versus position information associated with a position of the movable reflector.

Example 9. The display system of example 8, wherein the diffractive grating is positioned on, or forms part of, a MEMS mirror, and wherein the position information indicates an orientation of the MEMS mirror, the MEMS mirror being adjustable by the display system.

Example 10. The display system of example 1, wherein the light source is one of two light sources configured to output light to the movable reflector, wherein each of the light sources is configured to form a respective portion of the light pattern.

Example 11. The display system of example 1, wherein the light detectors are photodiodes, and wherein each light intensity pattern represents a plot of electrical current versus time.

Example 12. The display system of example 1, wherein the light pattern defines a V-shape extending from a lower portion of the eye to an upper portion of the eye.

Example 13. The display system of example 1, wherein the light forming the light pattern comprises polychromatic light.

Example 14. The display system of example 13, wherein the light pattern includes two portions extending in different directions.

Example 15. The display system of example 14, wherein each of the two portions is formed by light of different colors.

Example 16. The display system of example 14, wherein the two portions are configured to extend across a vertical axis of the eye, wherein the two portions extend in opposite directions along a horizontal axis to form a V-shape.

Example 17. The display system of example 1, wherein the light pattern comprises a plurality of sequential rows of light.

Example 18. The display system of example 17, wherein different rows of light comprise beams of light having different amounts of divergence.

Example 19. The display system of example 18, wherein a row of light comprises converging beams of light, wherein an other of the rows of light comprise collimated beams of light.

Example 20. The display system of example 18, wherein a row of light comprises diverging beams of light.

Example 21. The display system of example 17, wherein the rows of light define an angle of less than 90° relative to a horizontal axis of the eye.

Example 22. The display system of example 1, wherein positions of the light detectors define corners of a rectangle about the eye.

Example 23. The display system of example 1, wherein the light detectors define a linear array of light detectors.

Example 24. The display system of example 1, wherein the operations further comprise causing continuous scanning of the light pattern on an axis between a first portion of the eye and a second portion of the eye.

Example 25. The display system of example 24, wherein the axis is a horizontal axis of the eye, such that the first portion is a left or right-most portion of the eye and the second portion is the other of the left or right-most portion of the eye.

Example 26. The display system of example 1, wherein determining the eye pose comprises: applying a machine learning model via computing a forward pass of the light intensity patterns, wherein an output of the machine learning model indicates an eye pose.

Example 27. The display system of example 1, wherein determining the eye pose comprises: accessing information identifying stored light intensity patterns, the stored light intensity patterns being associated with respective eye poses; comparing the obtained light intensity patterns with the stored light intensity patterns; and identifying the eye pose based on the comparing.

Example 28. The display system of example 26, wherein the light detectors are photodiodes, wherein comparing the obtained light intensity patterns with the stored light intensity patterns is based on comparing positions of peaks and/or valleys of electrical current, and wherein the positions are indicative of locations of the optical pattern on the eye.

Example 29. The display system of example 1, wherein the operations further comprise: determining an interpupillary distance of the user; determining, based upon the determined interpupillary distance, a scan distance across the eye to scan the light pattern; and scanning the light pattern the scan distance across the eye.

Example 30. The display system of example 1, wherein the operations further comprise detecting, based on the light intensity patterns, one or both of an iris and pupil of the eye.

Example 31. The display system of example 30, wherein detecting one or both of the iris and pupil of the eye comprises determining a size of one or both of the iris and pupil of the eye.

Example 32. The display system of example 30, wherein detecting one or both of the iris and pupil of the eye comprises determining a position of one or both of the iris and pupil of the eye.

Example 33. The display system of example 1, wherein the operations further comprise determining a saccadic velocity of the eye.

Example 34. The display system of example 1, further comprising a waveguide comprising out-coupling optical elements configured to output light to an eye of the user to form the virtual content.

Example 35. The display system of example 29, wherein the waveguide is one of a stack of waveguides, wherein some waveguides of the stack have out-coupling optical elements configured to output light with different amounts of wavefront divergence than out-coupling optical element of other waveguides of the stack, wherein the different amounts of wavefront divergence correspond to different depth planes.

Example 36. A method implemented by a display system of one or more processors, the display system being configured to present virtual content to a user based, at least in part, on an eye pose of an eye of the user, wherein the method comprises: adjusting a position of a light pattern directed onto the eye, such that the light pattern moves across the eye; obtaining a plurality of light intensity patterns, the light intensity patterns representing light detector signals at different times, the light detector signals obtained from respective light detectors during adjustment of the position of the light pattern; and determining, based on the light intensity patterns, the eye pose of the eye, the eye pose representing an orientation of the eye.

Example 37. The method of example 36, wherein adjusting the position of the light pattern comprises moving a moveable mirror such that the light pattern is moved from a first portion of the eye to a second portion of the eye along an axis.

Example 38. The method of example 37, wherein the movable reflector comprises a diffractive grating, wherein the diffractive grating is configured to convert an incident beam of light from the light source into a light pattern comprising multiple beams of light.

Example 39. The method of example 37, wherein moving the moveable mirror comprises rotating a microelectromechanical systems (MEMS) mirror on which the diffraction grating is positioned.

Example 40. The method of example 37, wherein the first portion represents an extremity of the iris and the second portion represents an opposite extremity of the iris along the axis.

Example 41. The method of example 37, wherein the axis is a horizontal axis.

Example 42. The method of example 36, wherein the light pattern extends along a vertical axis from a lower portion of the eye to an upper portion of the eye.

Example 43. The method of example 42, wherein the light pattern comprises two portions, each portion extending along a vertical axis, and wherein the two portions extend in opposite directions along a horizontal direction to form a V-shape.

Example 44. The method of example 36, wherein determining eye pose comprises: applying a machine learning model via computing a forward pass of the light intensity patterns, wherein an output of the machine learning model indicates an eye pose.

Example 45. The method of example 36, wherein determining eye pose comprises: accessing information identifying stored light intensity patterns, the stored light intensity patterns being associated with respective eye poses; comparing the obtained light intensity patterns with the stored light intensity patterns; and identifying the eye pose based on the comparing.

Example 46. The method of example 45, wherein comparing the obtained light intensity patterns with the stored light intensity patterns is based on comparing positions of peaks and/or valleys in the light intensity patterns.

Example 47. Non-transitory computer storage media storing instructions that when executed by a display system of one or more processors, cause the one or more processors to perform operations comprising: adjusting a position of a light pattern directed onto an eye of a user, such that the light pattern moves across the eye; obtaining a plurality of light intensity patterns, the light intensity patterns representing light detector signals at different times, the light detector signals obtained from respective light detectors during adjustment of the position of the light pattern; and determining, based on the light intensity patterns, an eye pose of the eye, the eye pose representing an orientation of the eye.

Example 48. The computer storage media of example 47, wherein the operations further comprise: causing projection of the light pattern to the eye via a reflector having a diffractive grating.

Example 49. The computer storage media of example 48, wherein the orientation of the diffractive grating is adjusted such that the light pattern is moved from a first portion of the eye to a second portion of the eye.

Example 50. The computer storage media of example 49, wherein the first portion represents an extremity of the iris and the second portion represents an opposite extremity of the iris.

Example 51. The computer storage media of example 47, wherein the light pattern extends from a lower portion of the eye to an upper portion of the eye along a vertical axis.

Example 52. The computer storage media of example 51, wherein the light portion comprises two portions, each portion extending across the eye along a vertical axis, and wherein the two portions extend in opposite directions along a horizontal axis.

Example 53. The computer storage media of example 47, wherein the adjusting an orientation of the diffraction grating comprises controlling rotation of a microelectromechanical systems (MEMS) mirror on which the diffraction grating is positioned.

Example 54. The computer storage media of example 47, wherein determining eye pose comprises: applying a machine learning model via computing a forward pass of the light intensity patterns, wherein an output of the machine learning model indicates an eye pose.

Example 55. The computer storage media of example 47, wherein determining eye pose comprises: accessing information identifying stored light intensity patterns, the stored light intensity patterns being associated with respective eye poses; comparing the obtained light intensity patterns with the stored light intensity patterns; and identifying the eye pose based on the comparing.

Example 56. The computer storage media of example 55, wherein comparing the obtaining light intensity patterns with the stored light intensity patterns is based on comparing positions of peaks and/or valleys.

Example 57. A display system configured to present virtual content to a user, the display system comprising: a light source configured to output light; a movable reflector configured to reflect the outputted light to the eye of the user to scan a pattern formed of the light across the eye; a plurality of light detectors configured to detect reflections of the light scanned across the eye; and one or more processors configured to perform operations comprising: obtaining, via the light detectors, respective light intensity patterns, wherein a light intensity pattern represents light detector signals at different times, the light detector signals obtained during scanning of the reflected light across the eye; and determining, based on the light intensity patterns, one or both of a size and position of a physiological feature of the eye.

Example 58. The display system of example 57, wherein the physiological feature is a pupil of the eye.

Example 59. The display system of example 58, wherein the operations further comprise: determining a first interface between an iris and the pupil of the eye based on the light intensity patterns.

Example 60. The display system of example 59, wherein determining the first interface is based on positions of peaks and/or valleys in the light intensity patterns.

Example 61. The display system of example 59, wherein the operations further comprise: determining a second interface between the iris and the pupil of the eye based on the light intensity patterns.

Example 62. The display system of example 61, wherein the size of the pupil is determined based on the first interface and the second interface.

Example 63. The display system of example 61, wherein the physiological feature is the pupil, and wherein the position of the pupil is determined based on a center of the pupil, the center being identified based on the first interface and the second interface.

Example 64. The display system of example 57, wherein the physiological feature is an interface between an iris and a pupil of the eye, and wherein the display system determines the position of the interface.

Example 65. A method implemented by a display system of one or more processors, the display system being configured to present virtual content to a user based, at least in part, on an eye pose of an eye of the user, wherein the method comprises: adjusting a position of a light pattern directed onto the eye, such that the light pattern moves across the eye; obtaining a plurality of light intensity patterns, the light intensity patterns representing light detector signals at different times, the light detector signals obtained from respective light detectors during adjustment of the position of the light pattern; and determining, based on the light intensity patterns, a size and/or position of a physiological feature of the eye.

Example 66. The method of example 65, wherein the physiological feature is a pupil of the eye.

Example 67. The method of example 66, further comprising: determining a first interface between an iris and a pupil of the eye based on the light intensity patterns.

Example 68. The method of example 67, wherein determining the first interface is based on positions of peaks and/or valleys in the light intensity patterns.

Example 69. The method of example 68, further comprising: determining a second interface between the iris and the pupil of the eye based on the light intensity patterns.

Example 70. The method of example 69, wherein the physiological feature is the pupil, and wherein the size of the pupil is based on the first interface and the second interface.

Example 71. The method of example 69, wherein the physiological feature is the pupil, and wherein the position of the pupil is based on a center of the pupil, the center being identified based on the first interface and the second interface.

Example 72. The method of example 65, wherein the physiological feature is an interface between an iris and a pupil of the eye, and wherein the display system determines the position of the interface.

Example 73. Non-transitory computer storage media storing instructions that when executed by a display system of one or more processors, cause the one or more processors to perform operations comprising: adjusting a position of a light pattern directed onto an eye of a user, such that the light pattern moves across the eye; obtaining a plurality of light intensity patterns, the light intensity patterns representing light detector signals at different times, the light detector signals obtained from respective light detectors during adjustment of the position of the light pattern; and determining, based on the light intensity patterns, a size and/or position of a physiological feature of the eye.

Example 74. The computer storage media of example 73, wherein the operations further comprise: determining a first interface between an iris and a pupil of the eye based on the light intensity patterns.

Example 75. The computer storage media of example 74, wherein determining the interface is based on positions of peaks and/or valleys in the light intensity patterns.

Example 76. The computer storage media of example 74, wherein the operations further comprise: determining a second interface between the iris and the pupil of the eye based on the light intensity patterns.

Example 77. The computer storage media of example 76, wherein the physiological feature is the pupil, and wherein the size of the pupil is determined based on the first interface and the second interface.

Example 78. The computer storage media of example 76, wherein the physiological feature is the pupil, and wherein the position of the pupil is based on a center of the pupil, the center being identified based on the first interface and the second interface.

Example 79. The computer storage media of example 73, wherein the physiological feature is an interface between an iris and a pupil of the eye, and wherein the display system determines the position of the interface.

Example 80. A display system configured to present virtual content to a user, the display system comprising: a light source configured to output light; a movable reflector configured to reflect the outputted light to the eye of the user to scan a pattern formed of the light across the eye; a plurality of light detectors configured to detect reflections of the light scanned across the eye; and one or more processors configured to perform operations comprising: obtaining, via the light detectors, respective light intensity patterns, wherein a light intensity pattern represents light detector signals at different times, the light detector signals obtained during scanning of the reflected light across the eye; and determining, based on the light intensity patterns, a speed of rotation of the eye.

Example 81. The display system of example 80, wherein determining the speed of rotation of the eye comprises determining a saccadic velocity of the eye.

Example 82. The display system of example 81, wherein the operations further comprise predicting a pose of the eye based upon the saccadic velocity.

Example 83. A method implemented by a display system of one or more processors, the display system being configured to present virtual content to a user based, at least in part, on an eye pose of an eye of the user, wherein the method comprises: adjusting a position of a light pattern directed onto the eye, such that the light pattern moves across the eye; obtaining a plurality of light intensity patterns, the light intensity patterns representing light detector signals at different times, the light detector signals obtained from respective light detectors during adjustment of the position of the light pattern; and determining, based on the light intensity patterns, a speed of rotation of the eye.

Example 84. Non-transitory computer storage media storing instructions that when executed by a display system of one or more processors, cause the one or more processors to perform operations comprising: adjusting a position of a light pattern directed onto an eye of a user, such that the light pattern moves across the eye; obtaining a plurality of light intensity patterns, the light intensity patterns representing light detector signals at different times, the light detector signals obtained from respective light detectors during adjustment of the position of the light pattern; and determining, based on the light intensity patterns, a speed of rotation of the eye.

BRIEF DESCRIPTION OF THE DRAWINGS

FIG. 10A illustrates a plan view of a system and technique for determining eye pose of a user.

FIG. 12 illustrates an example flowchart of a process for determining eye pose of a user's eye.

FIGS. 13A-13C illustrate an example of a light pattern being projected onto and scanned across a user's eye.

FIGS. 14A-14C illustrate another example of a light pattern being projected onto and scanned across a user's eye, with the user's eye in a different pose than the eye shown in FIGS. 13A-13C.

FIGS. 17A-17C illustrate the use of two light sources for generating light patterns for determining eye pose of a user.

FIGS. 18B-D illustrate an example of determining size and/or position information associated with one or more physiological features.

DETAILED DESCRIPTION

AR and/or VR systems may display virtual content to a user, or viewer. For example, this content may be displayed on a head-mounted display, e.g., as part of eyewear, that projects image information to the user's eyes. In addition, where the system is an AR system, the display may also transmit light from the surrounding environment to the user's eyes, to allow a view of that surrounding environment. As used herein, it will be appreciated that a "head-mounted" or "head mountable" display is a display that may be mounted on the head of a viewer or user. Such displays may be understood to form parts of a display system.

Figure 1:
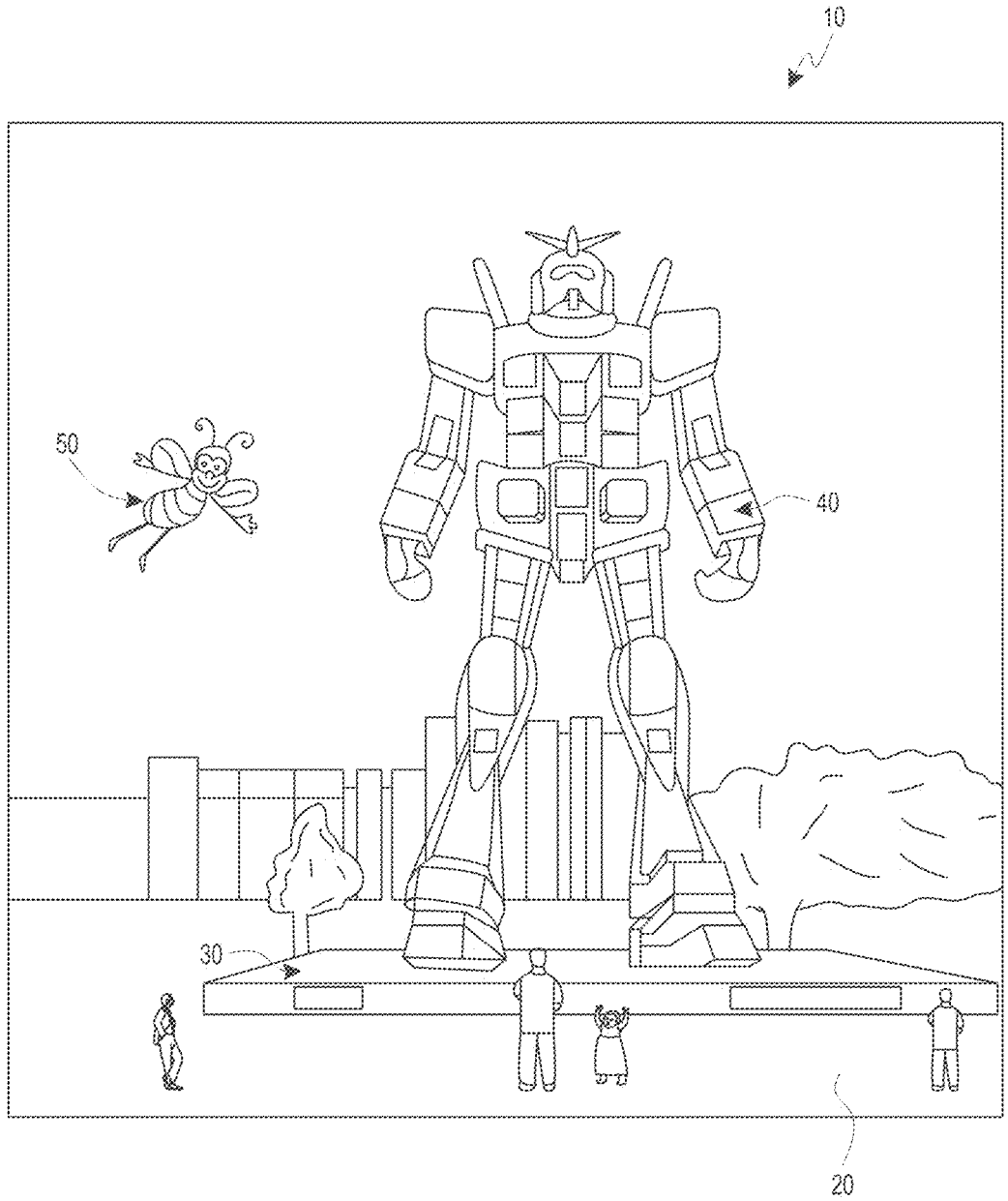
FIG. 1 illustrates a user's view of an augmented reality (AR) scene through an AR device.

To provide for visually realistic virtual content, it is advantageous for a display system to accurately track (e.g., monitor) a user's eyes. For example, an accurate determination as to an orientation of each eye (referred to herein as an eye pose) may enhance realism of presented virtual content. Indeed, a virtual scene (e.g., the augmented reality scene 10 illustrated in FIG. 1) may be rendered by a display system based on a user's eyes being assigned as "render cameras" for the scene. For example, a center of the user's eyes may be assigned as render cameras. Thus, locations of virtual content within the virtual scene may be tied to the center of the user's eyes, along with the gaze direction and vergence of their eyes. As the user moves his/her eyes, for example to view virtual content or real-world content, the display system may adjust virtual content accordingly. Thus, enhanced techniques for tracking the user's eyes may substantively enhance functionality of such display systems and provide a better viewing experience for the user.

Tracking a user's eyes may include determining vergence, gaze direction, respective centers of the user's eyeballs, and so on. At least some of these determinations may be effectuated based on an identification of respective eye poses for the user's eyes. For example, based on an eye's orientation, the display system may determine an axis (e.g., optical and/or visual axis) extending from the eye. This axis may represent a gaze direction of the user's eye. Using eye poses for both of the user's eyes, the display system may identify locations in three-dimensional space at which the user's eyes are verging.

It will be appreciated that gaze direction tracking may be utilized to determine the virtual content to display to the user; for example, virtual content that is tied to the real world may be adjusted to provide the correct correspondence with the real world by tracking where the user is looking. In addition, in display systems that provide virtual content on different depth planes, the point at which the user's eyes are verging may be utilized to determine the appropriate depth plane on which to display the virtual content.

Some existing techniques for determining eye pose have been limited in tracking speed, such that updates to eye pose may be constrained. This may cause undesirable latency or jitter in updating content to be displayed. Additionally, some existing techniques for determining eye pose have high power requirements. Also, some existing techniques require hardware and/or optical structures which undesirably increase the complexity of manufacturing processes for forming display systems with such hardware or systems.

For example, eye-tracking systems utilizing cameras and the analysis of captured images to determine eye pose may undesirably be constrained in tracking speed, may utilize large amounts of power, and may require a complicated and precise arrangement of cameras and light sources. Such camera-based systems may use a number of light emitting diodes (LEDs) to project light at a user's eyes. The LEDs may be positioned on the display system such that light from the LEDs is reflected from particular portions of the user's eyes (e.g., a pupil). A camera may be positioned on the display system to image the eye and determine the positions of the reflected light. As the user moves his/her eye (e.g., changes eye pose), the images and positions of reflected light may similarly change. Based analysis of the captured images of the eye, the display system may determine an eye pose.

The above-described example technique may allow for the accurate determination of a user's eye pose. However, they present certain technical challenges. For example, eye tracking speed may be limited by the rate at which the camera is able to capture and process images (e.g., at a rate of 60 Hz). The constraint on tracking speed may, as an example, limit an extent to which a presently determined eye pose may be relied upon. As an example, during certain quick movements of an eye (e.g., saccadic movements), the tracking speed may lag behind the movement of the eye, such that displayed content may not match, e.g., the gaze direction or vergence of the user's eyes. Additionally, limitations on tracking speed may introduce certain visual artifacts. For example, jitter may be introduced when presenting virtual content. Jitter may be caused, at least in part, by the determined eye pose being periodically inaccurate as virtual content is displayed.

In addition to the above-described challenges in presenting virtual content, existing camera-imaging based techniques for pose determination may have electrical and mechanical challenges. With respect to electrical constraints, the power draw may be high. Indeed, multiple light sources are required to be driven and a camera (e.g., an infra-red camera) is required to capture images of a user's eyes. Due to the complexity of image information, there is an added processing aspect which requires power to analyze each image. This power requirement is in addition to the power necessary for presenting virtual content. Thus, the portability and battery life of a display using such camera-imaging based techniques may be undesirably low. With respect to mechanical constraints, there may be a complexity associated with positioning the LEDs and camera. For example, the LEDs may need to be aligned such that they project light onto certain positions of a user's eye. As another example, the camera may need to be aligned such that it obtains images in which all, or a portion, of the LEDs are visible in each image of the user's eye regardless of eye pose.

As discussed herein, various embodiments provide enhanced techniques and systems for tracking a user's eyes and advantageously address one or more of the above-noted technical concerns. For example, the eye tracking techniques may enable tracking at exceptionally high speeds (e.g., 1 kHz, 10 kHz, and so on). In some embodiments, the eye tracking techniques described herein may use only one light source per eye. For example, a diode (e.g., vertical-cavity surface-emitting laser diode), or other light emitting device, may be used for one or more eyes. In contrast to the requirement of a camera, the techniques described herein may use a threshold number of light detectors (e.g., photo-diodes, phototransistors, and so on) to detect the amount of reflected incident light and process the light intensity signal provided by this reflected light, rather than image the eye. Thus, the power requirements may be substantially less (e.g., an order of magnitude or more less). Additionally, the positioning of the diode and light detectors may be substantially simpler as compared to the above-described technique, since pose detection is based upon the pattern of detected light intensity over time, rather than an image analysis of the precise locations of reflected light in a captured image.

To determine eye pose for a user's eye, the technique described herein may scan light, such as a particular light pattern, across the user's eye. As an example, the light pattern may be projected such that it scans (e.g., sweeps) across the user's eye along a horizontal axis (which may be understood to extend through the centers of the user's left and right eyes). In some embodiments, the light pattern may include a line of light or multiple light spots that form a line that extends vertically at less than a 90° angle over the user's eye. For example, the light pattern may extend vertically from a lower portion of the user's eye to an upper portion of the eye. This light pattern may then be moved along the horizontal axis such that it scans the width of the user's eye or a portion thereof. In some other embodiments, scanning the light pattern across the user's eyes may involve moving the light pattern along a vertical axis across the height of the user's eye.

As will be described below, a moveable reflector (e.g., a microelectromechanical systems (MEMS) mirror) may be used to cause scanning of the light pattern. In some embodiments, the moveable reflector may have a diffractive grating. Light from a light source may be directed to the diffractive grating (also referred to as a diffraction grating), such that a particular light pattern is created. The moveable reflector may then move (e.g., rotate) about one or more axes, such that the light pattern is scanned across the user's eye as described above. In some embodiments, the moveable reflector may move about a single axis. For instance, in some such embodiments, the moveable reflector may be a one-dimensional MEMs mirror, and the light pattern employed may vary spatially in at least one other dimension.

Figure 10B:
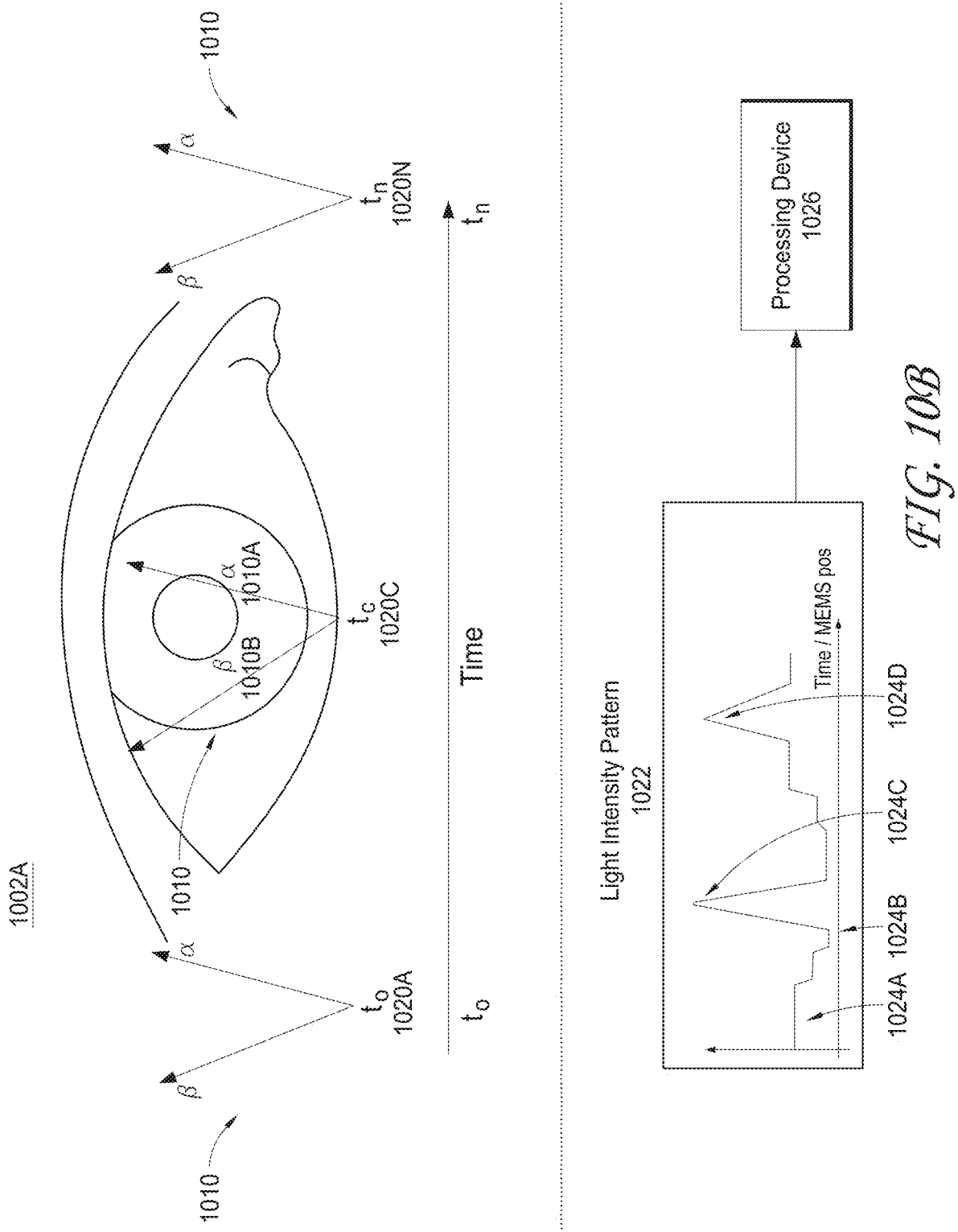
FIG. 10B illustrates an example reflected light intensity pattern associated with scanning the user's eye with a light pattern.

In some embodiments, the light pattern may be a "V" pattern. An example of such a light pattern is illustrated in FIGS. 10A-10B and described in more detail herein. This example pattern may include two portions, which each extend from a lower portion of the user's eye to an upper portion along a vertical axis. Each portion, however, may extend across a different horizontal portion of the user's eye. For example, each portion may be an angled line extending in opposite horizontal directions from the same lower portion (e.g., the two portions of the light pattern may form a "V").

As another example, a first portion of the light pattern may be scanned horizontally across the user's eye and then a second portion of the light pattern may also be scanned horizontally across the user's eye. The first and second portions may be the two legs of a "V" pattern in some embodiments. For example, the first portion may the right leg of the "V", such that an upper end leads a lower end of the first portion (herein referred to as an "alpha" portion) across the eye. A second portion of the light pattern (the left leg of the "V") may similarly be scanned horizontally across the user's eye such that a lower end leads an upper end of the second portion (herein referred to as a "beta" portion). It will be appreciated that the first and second portions extend in different directions. In some embodiments, the "V" shape may be inverted, to assume an "A" shape.

It will be appreciated that other light patterns may be used and fall within the scope of the disclosure herein. In some embodiments, the reflector may have a plurality of diffractive gratings that provide different light patterns depending upon the diffractive grating that light from a light source is incident.

Figure 11:
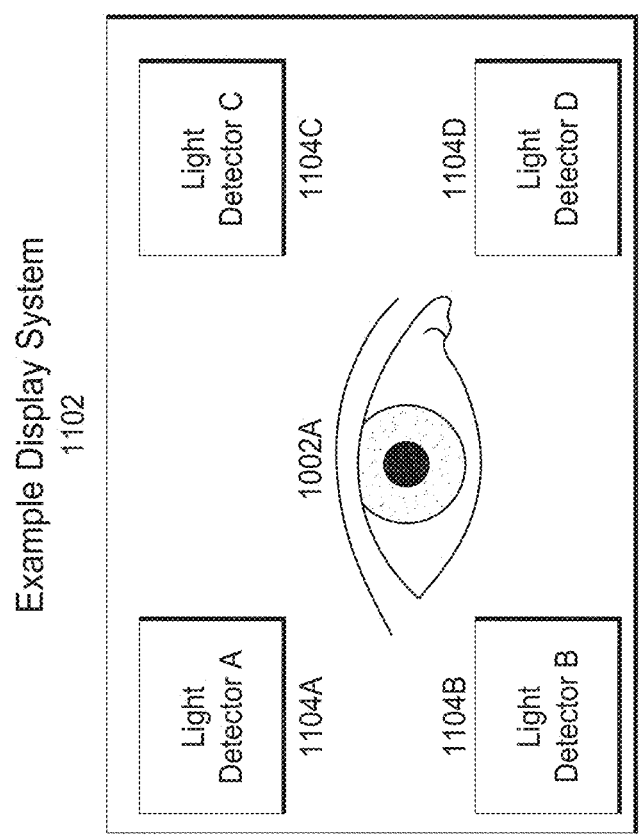
FIG. 11 illustrates an example positioning of light detectors within a display system for determining eye pose.

The user's eye may reflect the light pattern directed thereon by the moveable reflector. To determine eye pose, the display system may use light detectors to measure information (e.g., the intensity of light incident on the light detector) associated with the reflection. As an example, the display system may use photodiodes to convert received light into respective electrical currents. These photodiodes may preferably be on the display system at different positions relative to the eye. An example orientation of photodiodes is illustrated in FIG. 11. Each photodiode, located at different locations, receives different reflected light from the eye, and converts the different received light into a different pattern or plot of electrical current versus time as the light pattern is scanned across the eye. For ease of reference, the intensity of reflected light detected by a light detector at different points in time, as the light pattern is scanned across the eye, is referred to herein as a light intensity pattern. In some embodiments, the light intensity pattern may correspond to a pattern defined by or derived from electrical current at different points in time or different positions during the scan, where the reflected light is detected by a light sensor (e.g., a photodiode) that converts the light to electrical current. In some embodiments, each of one or more of the light detectors in the display system may be electrically coupled to generate a voltage indicative of the intensity of light incident on the respective light detector. In at least some of these embodiments, one or more photodiodes, phototransistors, and/or photoresistors may be used as light detectors in the display system.

Thus, for each scan of a light pattern across a user's eye, there may be a multitude of resulting light intensity patterns, each pattern detected by a different light detector. As discussed herein, the display system may use these light intensity patterns to determine an eye pose for the user's eye. It will be appreciated that different portions of the user's eye may cause light to be reflected differently (due to asymmetries in the shape of the eye and/or differences in the composition of different portions of the eye). Thus, for a given orientation of a user's eye, the resulting collection of light intensity patterns obtained from the different light detectors may be substantially unique; that is, a given eye pose may have a set of unique "signature" defined by the collection of light intensity patterns. Using a threshold number of these light intensity patterns, the display system may determine an eye pose by determining the eye post associated with the light intensity patterns.

In some embodiments, the light intensity pattern may include light having different properties in order to efficiently provide a plurality of different, differentiated signals per pass across the eye. For example, the light of the pattern may include a plurality of rows of light, each having, for example, different wavelengths or different polarizations. In some embodiments, each row of light may include a plurality of beams of light, for example, a row of light formed by converging beams, a row of light formed by collimated beams, and/or a row of light formed by diverging beams.

To determine an eye pose, in some embodiments, the display system may access stored information usable to correlate light intensity patterns to eye pose. For example, a machine learning model may be used to determine an eye pose based on an input of light intensity patterns. Optionally, the stored information may represent light intensity patterns which are known to be associated with certain eye poses. In some embodiments, the display system may determine eye pose based on analyzing the light intensity patterns. For example, the display system may use peaks, valleys, rates of curvature, and so on, as represented in the light intensity patterns to ascertain an eye pose. In this example, the display system may correlate among the different light intensity patterns to determine the eye pose.

Thus, various embodiments provide improvements and address technical challenges associate with eye tracking or eye pose determinations in display systems. As described above, the techniques described herein may allow for technical efficiencies. For example, a frequency or rate at which eye poses is determined may be increased. This increased frequency may allow for improved visual fidelity, realism, and viewing comfort when using a display system. Additionally, power requirements and mechanical alignment complexities may be reduced.

Advantageously, it will be appreciated that the light intensity patterns contain additional information which may be used for other purposes. For example, as discussed herein, different portions of the eye (e.g., the sclera, the iris, and the pupil) have different reflectivity, which provide different levels of reflected light intensities. These different reflected liabilities may be utilized to determine the positions and/or sizes of physiological features of the eye (e.g., the iris and/or the pupil). In addition, in some embodiments, the display system may determine the velocity of eye movement, e.g., the velocity of saccades, which may be useful for predicting the position of the eye after a saccade. In some embodiments, this prediction may be utilized as a check on the detected eye pose.

Reference will now be made to the drawings, in which like reference numerals refer to like parts throughout. Unless indicated otherwise, the drawings are schematic and not necessarily drawn to scale.

Example Display Systems

Figure 2:
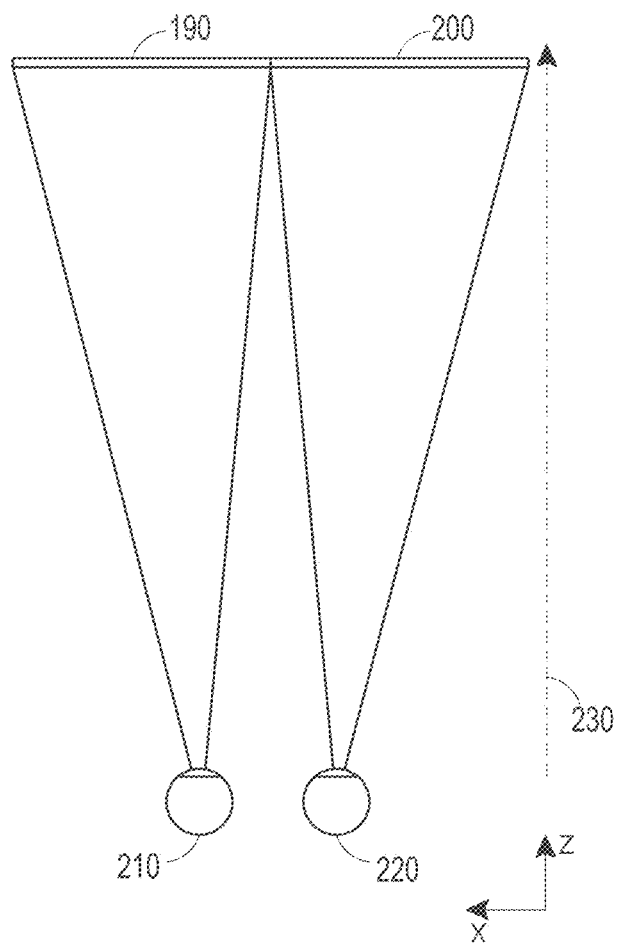
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
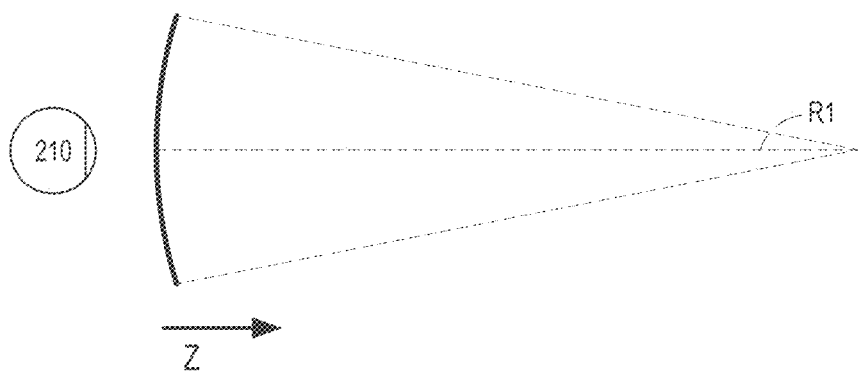
FIGS. 3A-3C illustrate relationships between radius of curvature and focal radius.
Figure 3B:
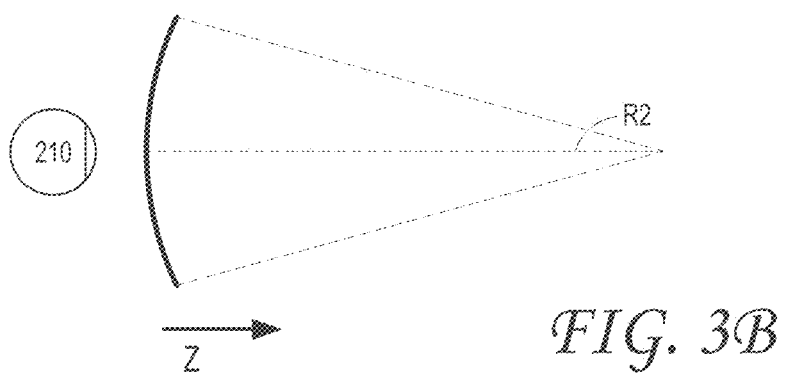
Figure 3C:
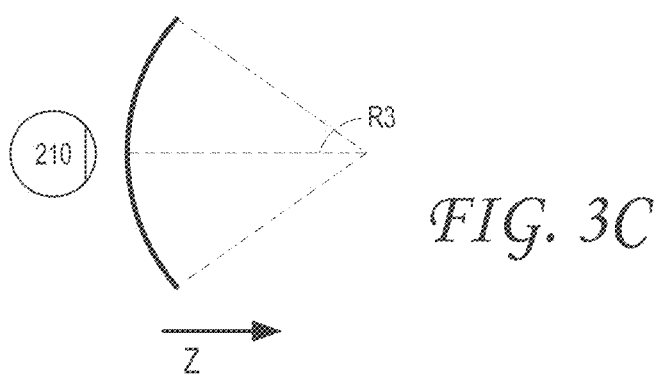

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it will be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
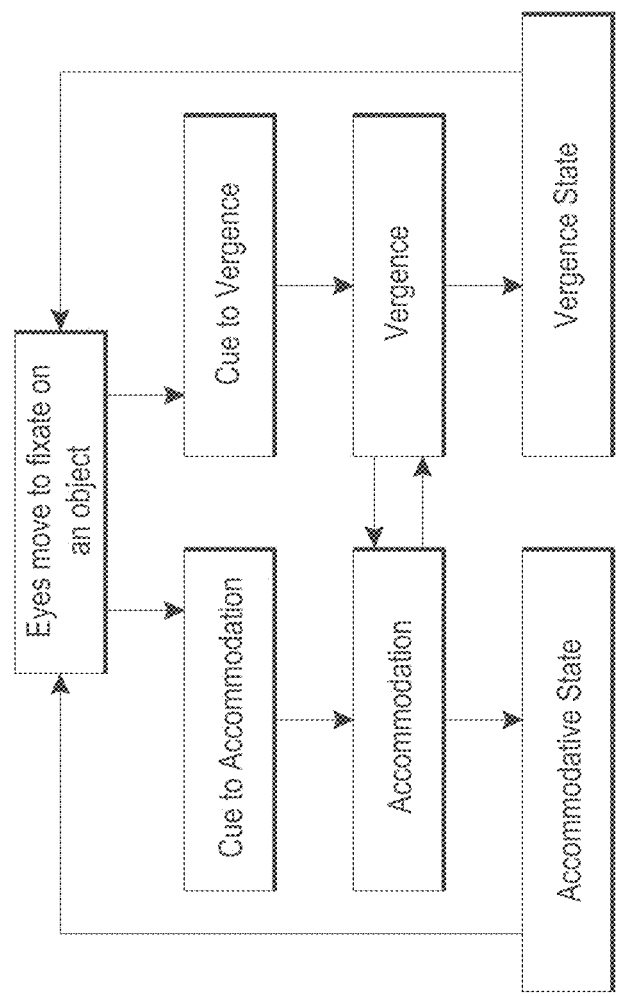
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
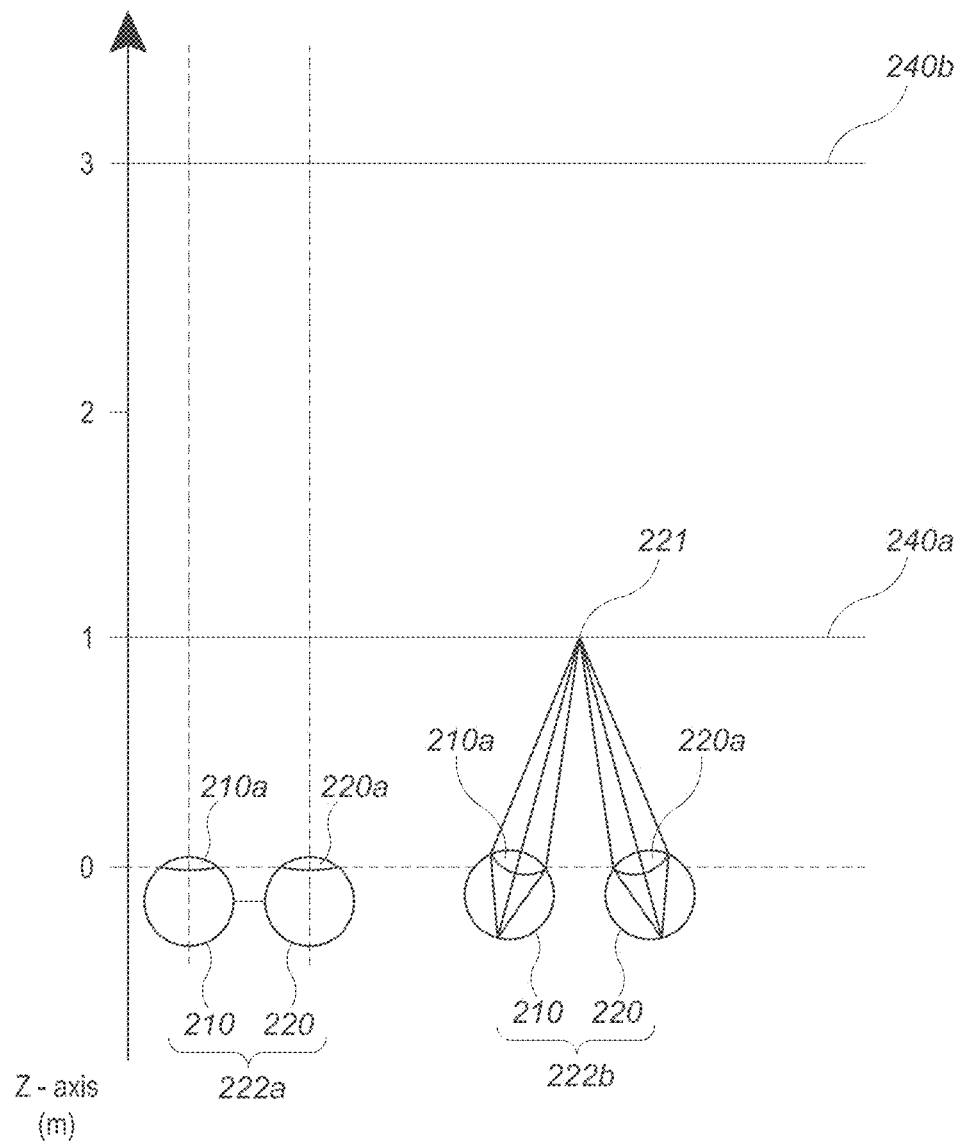
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
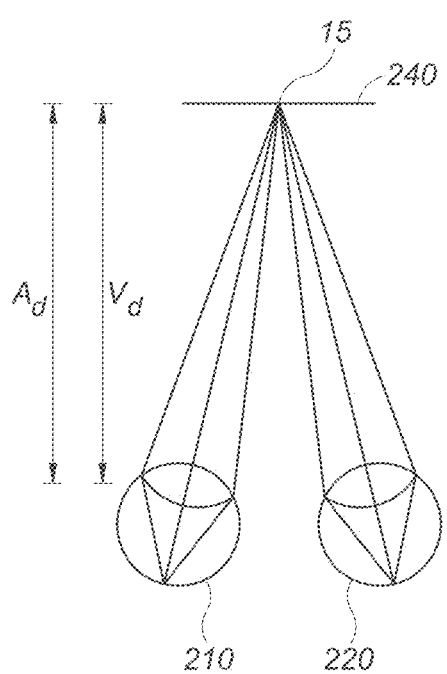
FIG. 4C illustrates an example of a representation of a top-down view of a user viewing content via a display system.
Figure 4D:
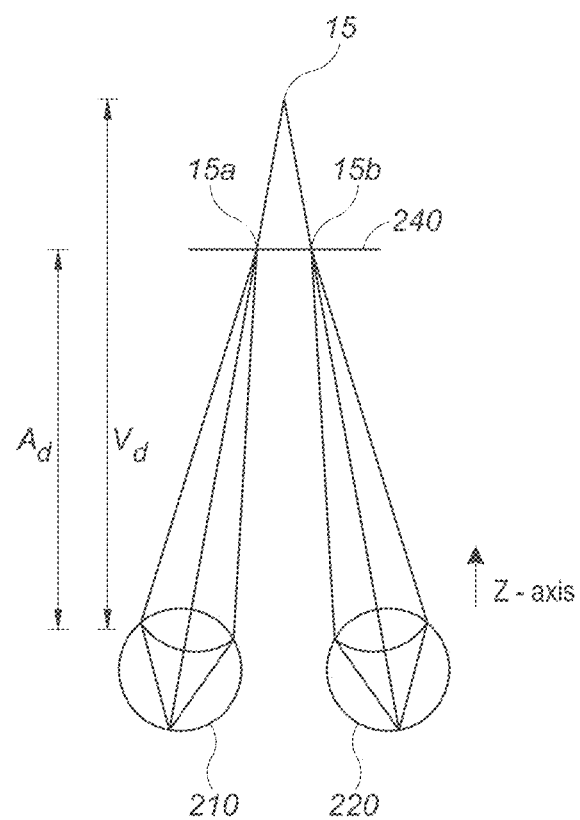
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_a$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_a$-$A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
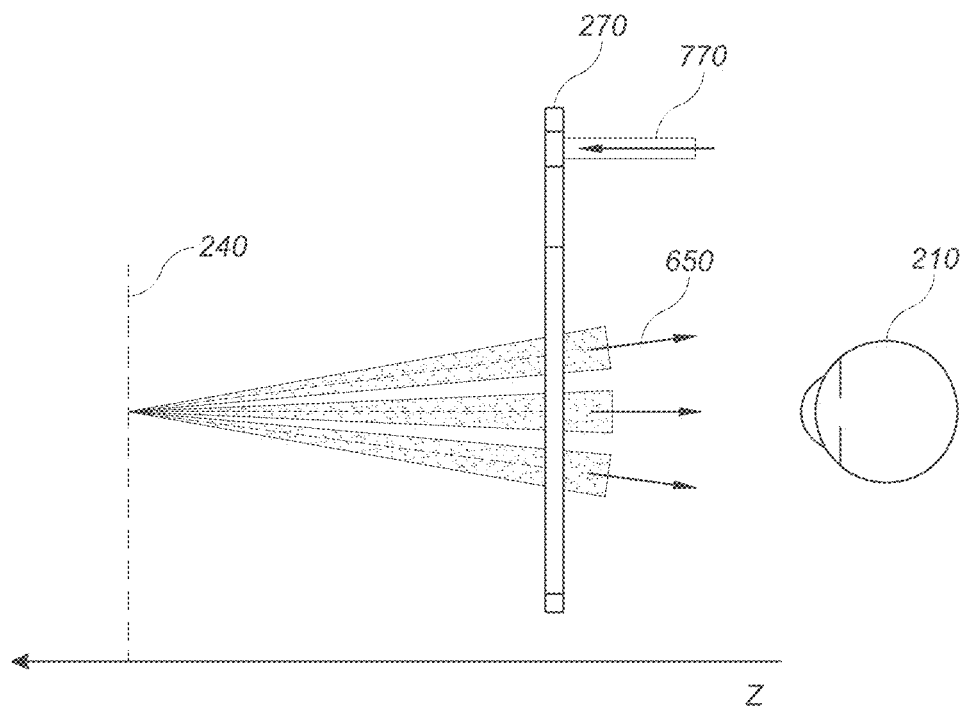
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
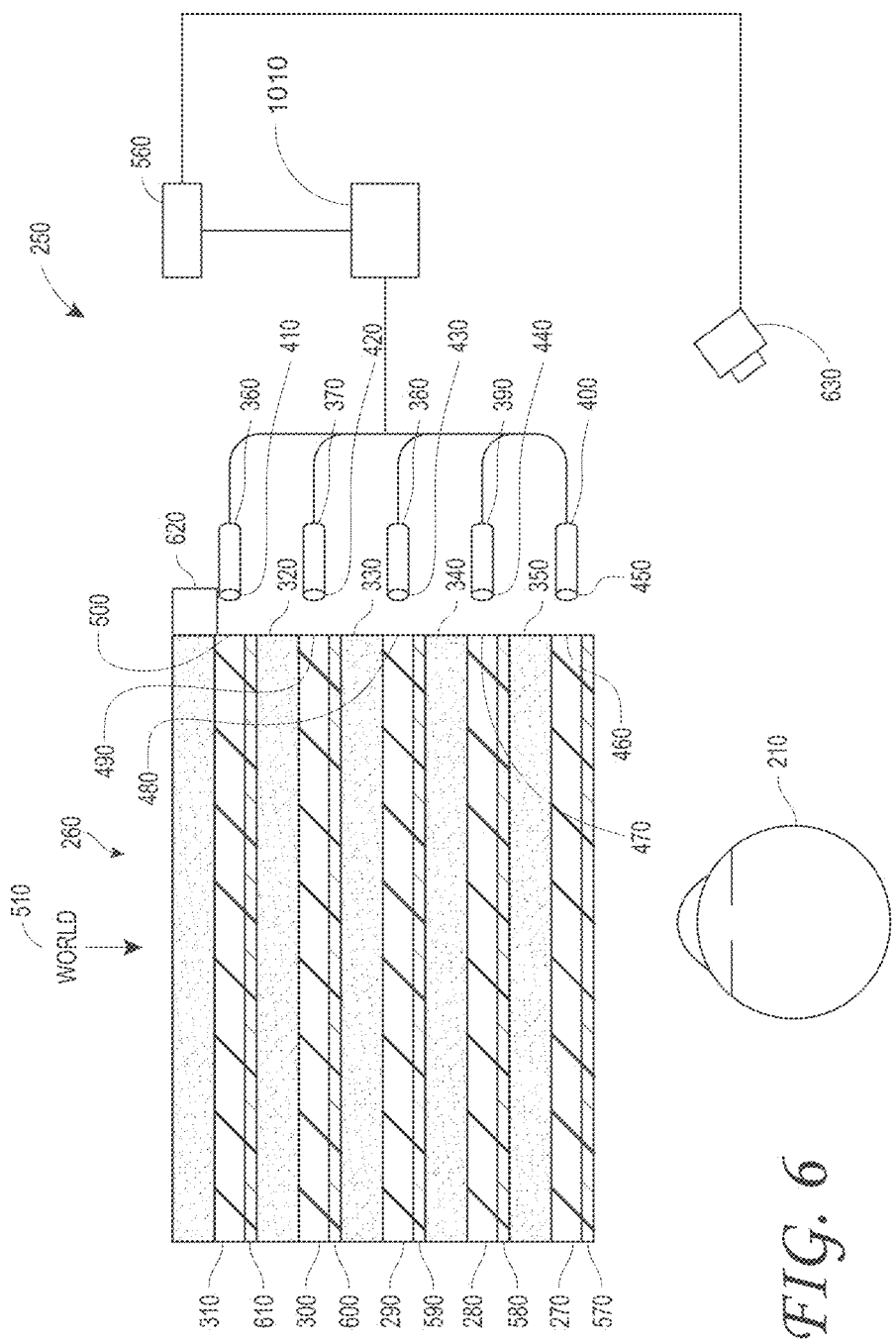
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g., a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is encoded with image information and provided by a light projector system 1010, as discussed further herein. In some embodiments, the light projector system 1010 may comprise one or more emissive pixel arrays. It will be appreciated that the emissive pixel arrays may each comprise a plurality of light-emitting pixels, which may be configured to emit light of varying intensities and colors. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the pixel array of the light projector system 1010 and the image may be the image on the depth plane.

A controller 560 controls the operation of one or more of the stacked waveguide assembly 260, including operation of the image injection devices 360, 370, 380, 390, 400, the light projection system 1010. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
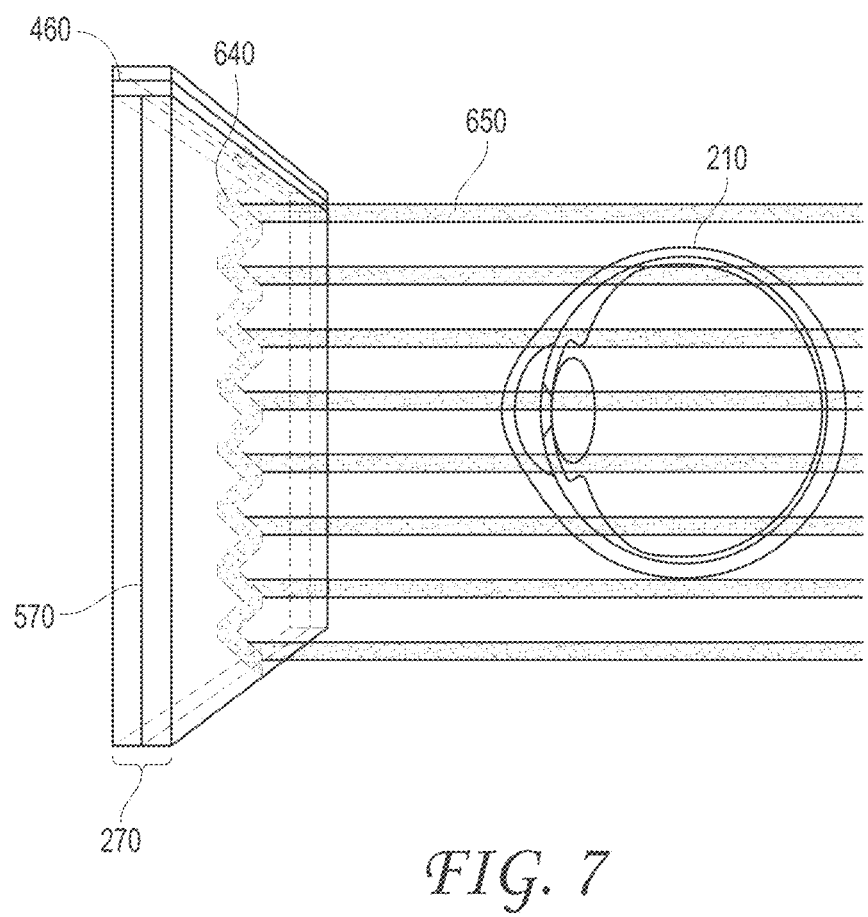
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
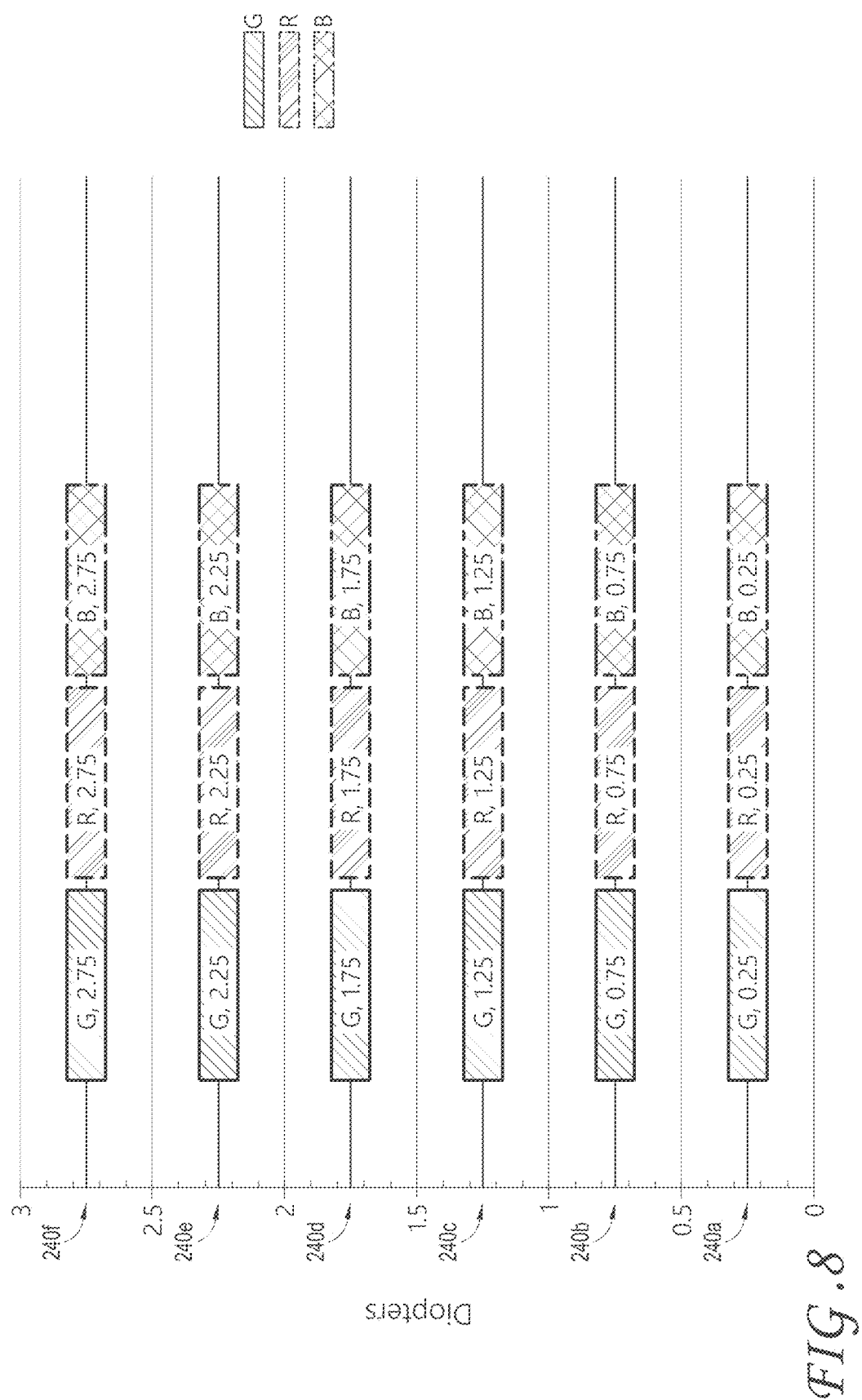
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light projection system 1010 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
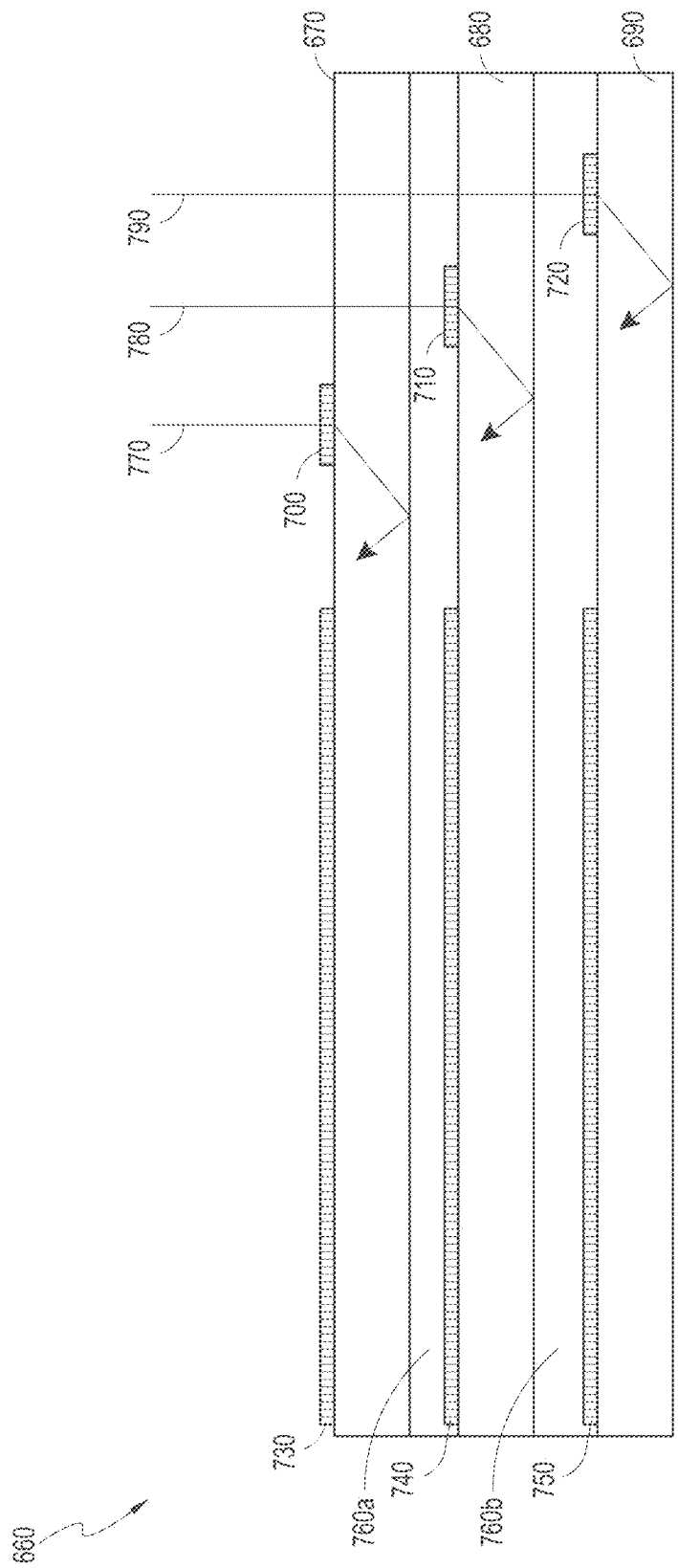
FIG. 9A illustrates a cross-sectional side view of an example of a set of stacked waveguides that each includes an in-coupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 are intended for different waveguides (e.g., waveguides configured to output light with different amounts of wavefront divergence, and/or configured to output light having different properties, such as different wavelengths or colors). Thus, in some embodiments, the light rays 770, 780, 790 may have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
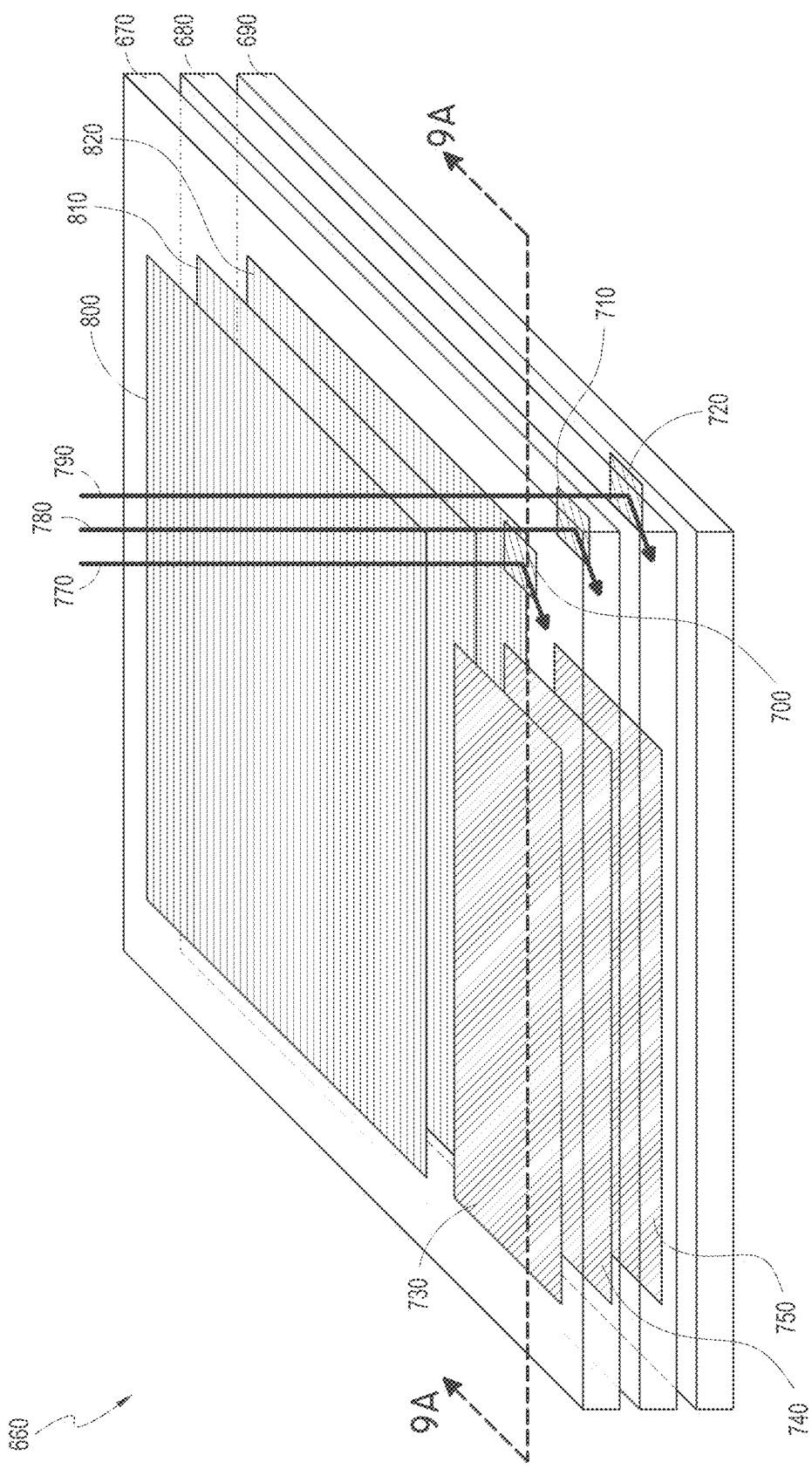
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPEs). In some embodiments, the OPEs deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EPs) or exit pupil expanders (EPEs) that direct light in a viewer's eye 210 (FIG. 7). It will be appreciated that the OPEs may be configured to increase the dimensions of the eye box in at least one axis and the EPEs may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPEs) 730, 740, 750; and out-coupling optical elements (e.g., EPs) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPEs) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EPs) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
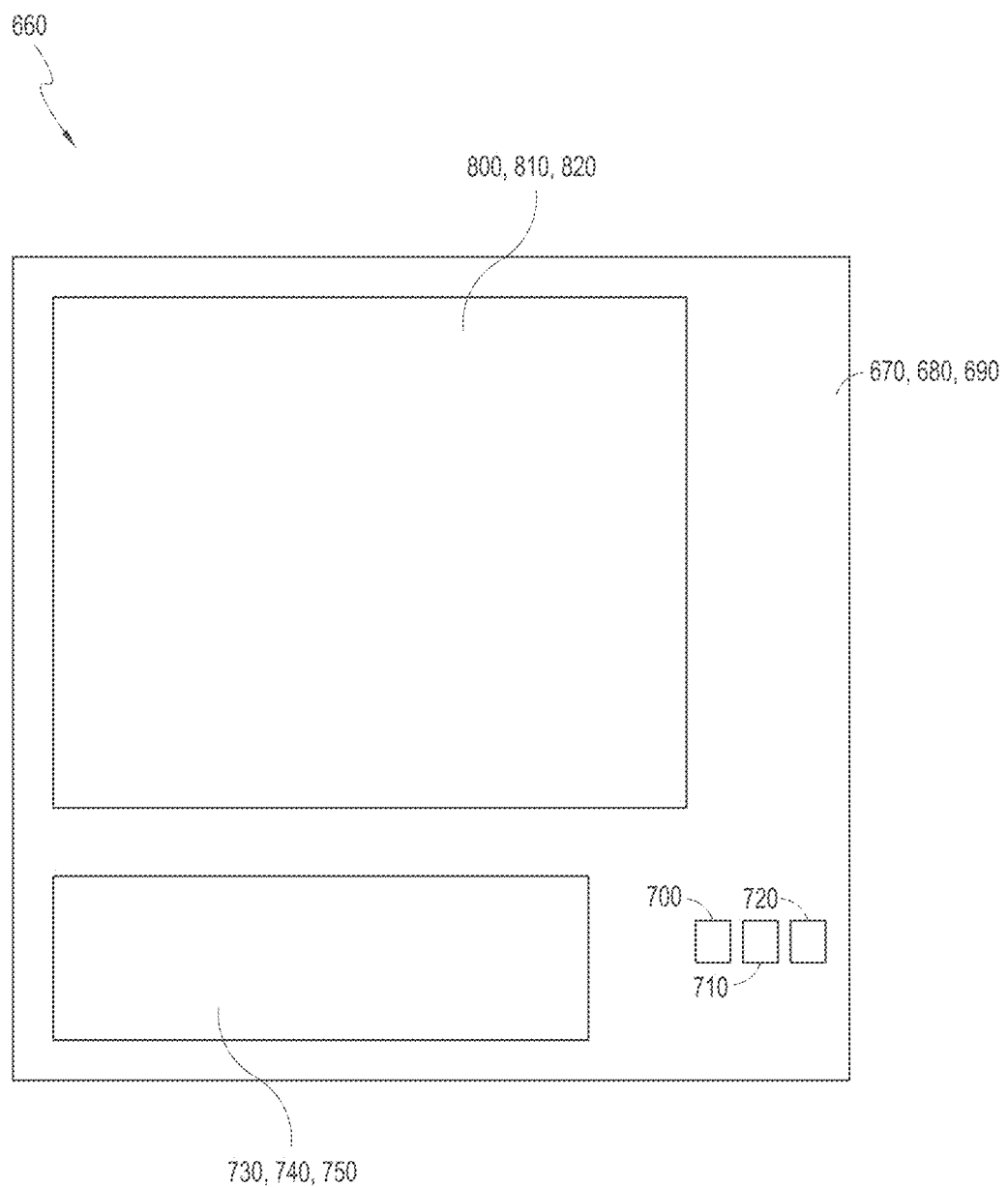
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
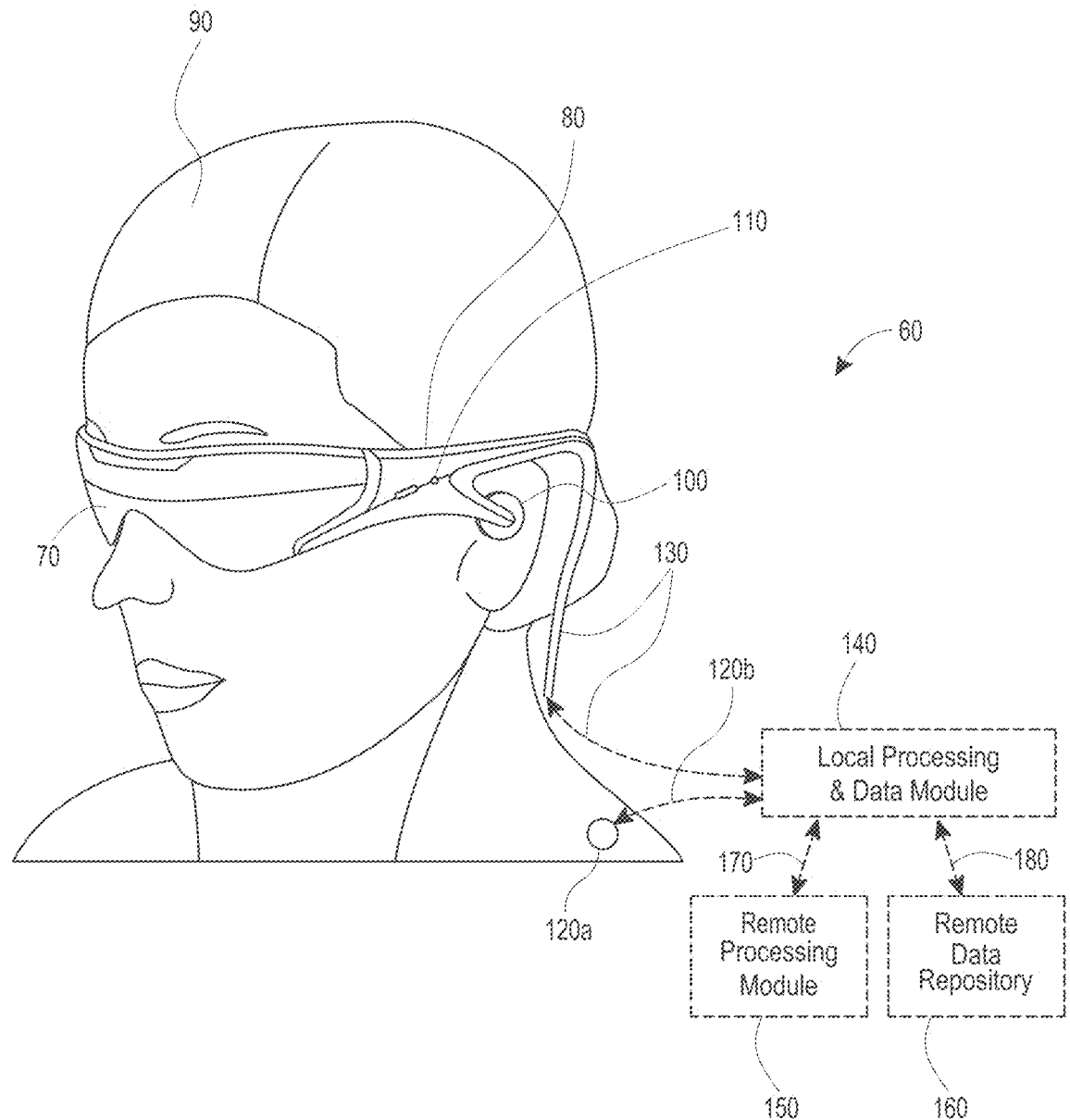
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUS), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Enhanced Eye Pose Determination Techniques

A display system (e.g., display system 60, FIG. 9D) described herein may be used to present augmented or virtual reality content (referred to herein as virtual content). To present virtual content, the display system may monitor eye poses of a user's eyes. As described herein, an eye pose may indicate an orientation of the eye, which may be utilized to identify various parameters, such as a particular axis (e.g., optical and/or visual axis) of the eye. Described below are techniques that, in some embodiments, may be applied to increase a speed at which eye pose may be determined, while additionally reducing power requirements and enabling mechanical efficiencies.

As described above, determining an eye pose may be used for various purposes to improve the viewing experience, and functionality, associated with presentation of virtual content. For example, an eye pose may inform how the display system renders virtual content. In this example, the display system may place render cameras at a respective center of the user's eyeballs, to provide the correct views of virtual content to present to the user. Additionally, the display system may use rapid eye pose determinations to reduce accommodation-vergence mismatches. As described in FIGS. 4A-4D, vergence-accommodation mismatches may be present in display system comprising a limited number of depth planes. Each of the depth planes may correspond to a particular range of depths from the user. Each depth plane has associated accommodation cues, and there may be limited available accommodation cues corresponding to the limited number depth planes. In contrast, vergence cues may be updated via adjusting a dichoptic presentation of virtual content. Thus, accommodation cues throughout a depth range may be the same while vergence cues may be adjusted throughout that depth range. The accommodation cues to provide to the user may be selected based upon the data plane on which their eyes are verging. Determinations of verging that lag the actual pose of the eyes may undesirably introduce accommodation-vergence mismatches by providing accommodation cues which do not correspond to the present vergence point (and plane) of the eyes. By accurately determining eye pose in real time, the display system may determine the depth plane on which the eyes are verging, thereby allowing the display system to provide the accommodation cues for that depth plane, to maintain accommodation-vergence mismatch at low levels.

Advantageously, using the techniques described herein, eye pose may be determined at a substantially higher frequency (e.g., 1 kHz, 10 kHz, and so on) as compared to some existing techniques. Additionally, this determination may be effectuated using components which require less power than some existing techniques. For example, light (e.g., infrared or near infrared light) may be directed from a light source (e.g., a diode, such as a VCSEL) onto a user's eye. In some embodiments, the light may be reflected off of a movable reflector having a diffractive grating, with the diffractive grating providing a light pattern. In some other embodiments, the light pattern may be formed at the light source (e.g., using a diffractive grating provided on an output surface of the light source). The moveable reflector may be rotated about one or more axes such that the reflected light scans (e.g., sweeps) across the user's eye. In some embodiments, the light may scan across the horizontal axis of the user's eyes, the horizontal axis extending from the center of one eye to the center of the other eye. As mentioned above, in some embodiments, the moveable reflector may be rotated about a single axis such that the reflected light scans (e.g., sweeps) across the user's eye in one dimension. For example, in at least some of these embodiments, the moveable reflector may be configured and/or controlled such that the position of the reflected light pattern varies temporally in a single, first dimension (e.g., across the horizontal axis of the user's eye), while the light pattern itself exhibits spatial variance in a second, different dimension (e.g., across the vertical axis of the user's eye). It is also to be understood that, in these embodiments, the moveable reflector may not be configured to rotate about more than one axis, or the moveable reflector may be configured to rotate about two or more axes, but controlled in a manner so as to rotate about only one of the axes. It is also to be understood that, in these embodiments, the light pattern itself may exhibit spatial variance in both the first and second dimensions. While the particular axis described herein is a horizontal axis, in some other embodiments the light may be scanned across a vertical axis of the user's eye.

Light reflected by the eye during this scan may be measured by a threshold number of light detectors (e.g., photodiodes) positioned about the display system. For example, the light intensity of the reflected light may be measured. Light intensity patterns, corresponding to the detected light intensity over time, as the light sweeps across the eye, may be determined. In some embodiments, the light intensity patterns may be formed based on electrical current generated by each light detector. As described herein, non-uniformities in the eye may cause light intensity patterns that are unique for different eye poses, and eye pose may thus be determined based on analysis of these light intensity patterns. For example, the light intensity patterns may be matched with expected patterns for different poses.

With reference now to FIG. 10A, a system and technique for determining the eye pose of a user is illustrated in a plan view. In the illustrated example, a user's eyes 1002A, 1002B are represented. The user may be a user of a display system, such as display system 60 (FIG. 9D), and may be viewing virtual content presented via the display system. Thus, the illustrated system may be understood to be part of the display system 60. For example, the light source 1302, movable reflector 1006, and light detectors 1014 may be attached to the frame 80 of the display system 60. The frame 80 and the remainder of the display system 60, however, are not shown for ease of illustration and discussion. In addition, while a system for detecting the orientation of the eye 1002A is illustrated, it will be appreciated that a similar system may be provided for the eye 1002B and may determine the orientation of the eye 1002B as discussed herein for the eye 1002A.

To determine the eye pose of the eye 1002A, an eye illumination system 1003 may be configured to direct light 1010 onto the eye 1002A and to scan the light 1010 across the eye 1002A. In some embodiments, the eye illumination system 1003 includes a light source 1302 which directs the light 1004 onto a moveable reflector 1006, which reflects that light onto the eye 1002A. In some embodiments, the moveable reflector 1006 may be a microelectromechanical systems (MEMS) mirror. As mentioned above, in some embodiments, the moveable reflector 1006 may be a one-dimensional MEMS scanning mirror. In some embodiments, the light source 1302 may be a diode that emits light. As an example, a vertical-cavity surface-emitting laser (VCSEL) may be used to output the light 1004. In some embodiments, other diodes, other lasers, including other sources of coherent light, and so on, may be used.

In some embodiments, the reflective surface of the moveable reflector 1006 may include a diffractive grating 1008. The light 1004 may be reflected by a diffractive grating 1008 on the moveable reflector 1006, such that a light pattern 1010 is formed. In some embodiments, the light 1004 may be polychromatic light (e.g., infrared and/or near infrared light). Different wavelengths (or colors) of light forming the polychromatic light may be diffracted in different directions, thereby creating the pattern 1010. In the example of FIG. 10A, the light pattern 1010 comprises two portions 1010A, 1010B which propagate in different directions away from the movable reflector 1006.

In some embodiments, the incident light 1004 may be monochromatic light (e.g., infrared or near infrared light). The two portions 1010A, 1010B may be formed using an appropriately configured diffractive grating (e.g., the diffractive grating may contain multiple sections having different orientations, sizes, geometries, etc. to achieve diffraction in the desired direction).

In this elevational view, these two portions 1010A, 1010B are illustrated as being projected towards the eye 1002A from the moveable reflector 1006. It will be appreciated, however, that the portions 1010A, 1010B may be configured such that they form a light of light, or row of light spots, spanning the eye 1002A in a vertical direction when incident on the eye 1002A. For example, the portions 1010A, 1010B may extend from a lower portion of the eye 1002A to an upper portion of the eye 1002A. A different perspective of this light pattern is illustrated in FIG. 10B, and will be described in more detail below.

With continued reference to FIG. 10A, the moveable reflector 1006 may be controlled by the display system to move and cause the light pattern 1010 to sweep along a horizontal axis across the eye 1002A. For example, and with respect to FIG. 10A, the light pattern 1010 may scan from a left portion of the eye 1002A to a right portion of the eye 1002A. In some embodiments, the light pattern 1010 may scan across an entirety of the sclera of the eye 1002A and across the iris and pupil, from one side of the eye to another side of the eye. In some embodiments, the breadth of the scan may be more limited. For example, in some embodiments, the displays system may be configured to scan the light pattern 1010 across an entirety of the iris of the eye 1002A but less than the entirety of the expanse of the eye along the axis across which the sweep proceeds. The moveable reflector 1006 may be adjusted such that it rotates about one or more axes. As mentioned above, in some embodiments, the moveable reflector 1006 may be adjusted such that it rotates about a single axis. It will be appreciated that this rotation may adjust an angle at which the light 1004 is incident upon the diffractive grating 1008, thereby changing the direction that light is reflected to the eye 1002A and changing the ultimate position that the light is incident on the eye 1002A. Thus, the light pattern 1010 may be swept across the eye 1002A by movement of the reflector 1006.

As illustrated, light detectors 1014 may receive reflected light 1012. It will be appreciated that the reflected light 1012 is the portion of the light 1010A, 1010B that is incident on and reflected from the eye 1002A to the light detectors 1014. The reflected light 1012 may be received by the light reflectors 1014 while the moveable reflector 1006 is causing the light pattern 1010 to sweep across a horizontal axis of the eye 1002A. It will be appreciated that different physiological features of the eye 1002A may reflect light differently. For example, the cornea 1016 may protrude out of the remainder of the eye to reflect light in different directions than other parts of the eye. In addition, different parts of the eye may have different reflectivity. For example, the sclera (the "white" of the eye) may be understood to reflect more light than the iris, which may reflect more light than the pupil. As another example, different parts of the eye may be associated with diffuse or specular reflections. The sclera, as an example, may cause diffuse reflections such that a resulting light intensity pattern, for example illustrated in FIG. 10B, may include light intensity peaks that more gradually increase, or decrease, in intensity and reach lower maximum intensity values than specular reflections. In contrast, specular reflections may be associated with a 'glint' and result in a sharp increase, or decrease, in intensity. Differentiating between diffuse light reflections and specular reflections may enable differentiation between reflections caused by portions of the eye, such as sclera, iris, and pupil (providing diffuse reflections) from reflections associated with "glint", which may be used for identifying eyeball/cornea curvature. Thus, the reflected light 1012 may vary in intensity during the scan, with the variations in intensity resulting from the eye features that the light 1010A, 1010B is incident. Depending on the orientation of the eye, these variations may be expected to occur at different points during the scan (e.g., at different times). The pattern of light intensity provided by the reflected light 1012 may thus represent a signature representative of a particular eye pose of the eye 1002A.

The light detectors 1014 may convert the reflected light 1012 into electrical current. The display system may store information identifying the electrical current (or values derived from the current) as plotted against time or a position of the moveable reflector 1006 or incident light 1010A, 1010B, or may simply have certain electrical current values (or values derived from the electrical current) associated with particular times and/or positions (or values derived from particular times and/or positions). Such a plot or sequence of values may be referred to herein as a light intensity pattern. An example light intensity pattern is illustrated in FIG. 10B. Preferably, multiple light intensity patterns derived from light detectors at different locations are utilized to increase the accuracy of the ultimate determination of eye pose (or other eye parameters, as discussed herein).

With reference again to FIG. 10A, the illustrated example may include a plurality of light detectors 1014, which are schematically represented as a single block. However, it will be appreciated that the light detectors 1014 may be located at different positions in the display system. For example, the system may include a plurality of light detectors arranged in a linear array, or at the corners of various shapes (e.g., four light detectors positioned in a rectangular configuration about the eye 1002A of the user).

Preferably, the light detectors are positioned in front of the eye 1002A such that they receive reflected light 1012 during scanning. An example of such a configuration is illustrated in FIG. 11. It will be appreciated that the light intensity pattern of FIG. 10B is an example of a single light intensity pattern detected using a single light detector 1014. Each of the illustrated light detectors 1104A-1104D may have different light intensity patterns due being differently positioned, causing them to receive light 1012 reflected in different directions.

Each of the light detectors may thus generate a light intensity pattern associated with scanning the light pattern 1010 across the eye 1002A, e.g., across the horizontal axis. As discussed herein, the light intensity patterns may be used by the display system to determine an eye pose for the eye 1002A. In some embodiments, subsequent to scanning across the horizontal axis, the light pattern 1010 may be scanned in an opposite direction. Thus, two scans may boptionally be performed. These two scans may be used by the display system to determine an eye pose for the eye 1002A. In some embodiments, the moveable reflector 1006 may generally cause the light pattern 1010 to scan in an opposite direction only when determining a subsequent eye pose. Thus, an eye pose for the eye 1002A may be determined based on a single scan of the eye 1002A in a direction across a horizontal axis (e.g., left to right). A subsequent eye pose for the eye 1002A may then be determined based on scanning in an opposite direction along the horizontal axis (e.g., right to left). Thus, the moveable reflector may not need to reset for each scan to a same position which causes scanning from a same initial position along a same horizontal direction. In this way, allowing scans to occur in opposite directions may increase a speed at which eye tracking may occur. For example, eye tracking speed may be doubled as compared to requiring a scan in a same direction for each eye pose determination.

The display system may then analyze the light intensity patterns to determine the eye pose for the eye 1002A. For example, the positions of the light detectors 1014 and moveable reflector 1006 may be known to the display system (e.g., via initial calibration). As another example, the positions of the light detectors 1014 may be the same as light detectors used to generate information usable to determine eye pose. As an example of determining the eye pose, each light intensity pattern may represent a signature pattern associated with an orientation of the eye 1002A. Thus, an aggregation of these light intensity patterns may be used to determine a specific eye pose with high accuracy.

In some embodiments, a machine learning model may be generated which outputs information identifying an eye pose based on an input of a threshold number of light intensity patterns. In this example, the machine learning model may have been trained based on a same, or similar, placement of the light detectors and moveable reflector. For example, light intensity patterns corresponding to known eye poses may have been generated using a similar placement of light detectors and moveable reflector within a display system. In this example, the machine learning model may then have been trained. As another example, light intensity patterns along with information identifying placement of the light detectors and moveable reflector (e.g., relative to an eye) may have been used as training information. In some embodiments, training information may additionally indicate positions of light sources and/or moveable reflectors.

In some embodiments, the display system may store information identifying light intensity patterns for each of a plurality of eye poses. Thus, the display system may determine measures of similarity between the measured light intensity patterns from the light detectors 1014 and the stored light intensity patterns. These measures of similarity may include measuring similarity in peaks, valleys, slopes, curve-fitting techniques, and so on.

As an example, a light intensity pattern measured by a particular light detector may include different peaks and valleys. These peaks and valleys may correspond to respective times or moveable reflector 1006 positions at which the two portions 1010A, 1010B of the light pattern 1010 reflect from the eye 1002A. Thus, there may be an "alpha" 1010A peak at a particular time or moveable reflector 1006 position. Additionally, there may be a "beta" 1010B peak at a subsequent time or moveable reflector 1006 position. The display system may determine eye pose based on these respective peaks. For example, the display system may identify the time or moveable reflector position for each of the peaks. The display system may use these identified times or MEMS positions for each of the photodiodes to match to a reference light intensity pattern corresponding to a known eye pose.

With reference again to FIG. 10B, an example is illustrated of a light intensity pattern 1022 associated with scanning the user's eye 1002A with light pattern 1010. As described in FIG. 10A, the moveable reflector 1006 may form light pattern 1010 and direct that pattern onto the user's eye 1002A with a diffractive grating 1008. Light detectors 1014 may then receive reflected light 1012 from the eye 1002A. As described above, there may be a threshold number of light detectors 1014 in different positions about the eye 1002A (e.g., 2, 3, 4, 6, or more light detectors). Thus, each light detector may convert respective received light into electrical current or a signal (e.g., a digital or analog signal). This electrical current or signal may be measured and stored as a light intensity pattern 1022 by the display system.

In the illustrated example, the light pattern 1010 (e.g., a "V" pattern) is provided to the user's eye 1002A at a first location. As illustrated, the light pattern 1010 may extend along a vertical axis of the user's eye 1002A. Additionally, the light pattern 1010 may include an "alpha" portion 1010A which is angled opposite to that of a "beta" portion 1010B. Thus, the portions 1010A, 1010B may be projected on different portions of the user's eye 1002A at any given time during the scan. These two portions 1010A, 1010B may be used to inform an eye pose of the eye 1002A, as described below. In some embodiments, to differentiate the different reflected light signals provided by each portion 1010A, 1010B, the portions may each be formed by light of different colors (from incident polychromatic light, as discussed herein). In some other embodiments, the different portions 1010A, 1010B may be formed by light of the same color, and may be generated at different times by illuminating different parts of the moveable reflector 1006, which may have different diffractive gratings in those different parts. Generating the portions 1010A, 1010B at different times allows the different signals provided by the portions 1010A, 1010B to be differentiated temporally. In some other embodiments, the portions 1010A, 1010B may be formed by light of the same color and may be scanned simultaneously across the eye.

With continued reference to FIG. 10*b*, at an initial time (e.g., time to), the moveable reflector 1006 may be at an extremity of its range of rotation. For example, the moveable reflector 1006 may be causing the light pattern 1010 to be at a left-most, or right-most, position on the eye 1002A. In the illustrated example, the initial time corresponds to the light pattern 1010 being projected onto a left-most portion of the eye 1002A. Light reflected from the eye 1002A may be measured at this position. An example of such an initial measurement 1024A is reflected in the light intensity pattern 1022 in FIG. 10B. The light pattern 1010 may be continuously, or discretely, moved across the eye 1002A by the moveable reflector 1006.

At a subsequent time 1020C, and thus a different moveable reflector 1006 position, the light pattern 1010 may be moved as illustrated in FIG. 10B. In this position of the moveable reflector 1006, the "alpha" portion 1010A of the light pattern 1010 has reached an extremity of the eye's 1002A pupil (e.g., a right-most portion). As illustrated in the light intensity pattern 1022, the corresponding light detector associated with pattern 1022 is positioned such that at the subsequent time 1020C, a peak 1024C (caused by a glint of the eye) is represented in the light intensity pattern 1022. In contrast, a valley 1024B is included in the light intensity pattern 1022 at an earlier time. This valley 1024B may represent, for example, the moveable reflector 1006 causing the "alpha" portion 1010A to reach an opposite extremity of the eye's 1002A pupil (e.g., a left-most portion). For this moveable reflector 1006 position corresponding to valley 1024B, the corresponding light detector associated with pattern 1022 may have limited visibility of reflected light and/or the light reflected to the light detector may be reflected from a part of the eye with low reflectivity. Thus, a valley 1024B may be represented in the light intensity pattern 1022.

The light intensity pattern 1022 illustrates another peak 1024D at a further time (e.g., at a further adjustment of the moveable reflector 1006). The peak 1024D may correspond to a "glint" (e.g., a specular reflection), at the same location having the glint causing the peak 1024C. This example peak 1024D may be generated based on the trailing "beta" portion 1010B of the light pattern 1010. For example, the corresponding light detector associated with pattern 1022 may have substantially maximum visibility of light reflected from the "beta" portion 1010B at this further time. As a non-limiting example, this peak 1024D may have been generated as the "beta" portion 1010B passes an extremity of the eye's 1002A pupil. This extremity may be the same extremity providing the glint causing the peak of the "alpha" portion 1010A. In this example, peak 1024D may correspond to the "beta" portion 1010B passing the extremity and peak 1024C may correspond to the "alpha" portion 1010A passing the same extremity.

With continued reference to FIG. 10b, a processing device 1026 may receive the light intensity pattern 1022 and use the pattern 1022 to determine an eye pose for the eye 1002A. The processing device 1026 may, in some embodiments, represent, or be included in, the local data and processing module 140 described above. The processing device 1026 may optionally obtain information identifying a direction associated with a scan of the light pattern 1010. For example, the resulting light intensity pattern 1022 may be based on whether the light pattern 1010 moves in a particular direction along the horizontal axis. As described above, with respect to FIG. 10A, the MEMS mirror 1006 may adjust to cause the light pattern 1010 to move along a first direction for a first eye pose. The MEMS mirror 1006 may then rotate in an opposite direction to cause the light pattern 1010 to move along an opposite scan direction for a second, subsequently determined, eye pose. In this way, the MEMS mirror 1006 may increase eye tracking speed as compared to requiring scanning along a same direction.

The processing device 1026 may obtain light intensity patterns from a plurality of light detectors. For example, where there are four light detectors, there may be at least four light intensity patterns associated with a same scan of the eye 1002A. Each of these light intensity patterns may include a unique pattern corresponding to the amount of reflected light incident on the associated light detectors. For example, a peak 1024C and a valley 1024B corresponding to the "alpha" portion 1010A may be positioned at different times or moveable reflector positions in different light intensity patterns. Thus, the processing device 1026 may use these light intensity patterns to identify an accurate eye pose for the eye 1002A.

Due to the high speed at which a MEMS mirror 1006 may be adjusted, and the limited information included in a light intensity pattern 1022, the processing device 1026 may rapidly determine an eye pose. In embodiments in which a machine learning model is used, the processing device 1026 may optionally compute a forward pass of a neural network. The neural network may optionally comprise one or more dense (e.g., fully-connected) layers. For example, values corresponding to electrical current and associated time or moveable reflector position may be provided to the neural network. The neural network may optionally comprise one or more convolutional layers which leverage the time-series nature of the light intensity patterns. These neural networks may have been previously trained. For example, training data may comprise known eye poses and corresponding light intensity patterns. In this example, the positions of the moveable reflector 1006 and photodiodes may optionally be the same as, or similar to, the positions as used to generate light intensity pattern 1022. Other machine learning models may be used and fall within the scope of the disclosure herein. For example, a support vector machine may be used.

In some embodiments, the processing device 1026 may access stored information identifying known light intensity patterns and associated eye poses. The processing device 1026 may then correlate the measured light intensity patterns (e.g., light intensity pattern 1022) with the stored information. The peaks (e.g., peak 1024C) and valleys (e.g., valley 1024B) in the measured light intensity patterns may be correlated with peaks and valleys in the stored information. As described above, the moveable reflector 1006 may optionally scan across the eye 1002A along a first direction or a second, opposite, direction. Thus, the processing device 1026 may optionally reverse (e.g., reflect), or otherwise apply a linear transform to, the stored light intensity patterns or measured light intensity patterns depending on a direction of the scan.

For example, the processing device 1026 may access stored light intensity patterns for a particular light detector of the light detectors 1014. In this example, the processing device 1026 may identify a particular stored light intensity pattern which is closest to that of a measured light intensity pattern for the particular light detector. While such a particular stored light intensity pattern may be identified based on a multitude of different metrics, in some embodiments, the processing device 1026 may identify a particular light intensity pattern with similar positions of peaks and valleys. With respect to the light intensity pattern 1022, the processing device 1026 may identify a stored light intensity pattern which has peaks 1024C-1024D and valleys 1024B at similar times and/or similar moveable reflector 1006 positions.

Using a threshold number of these light intensity patterns 1022, the processing device 1026 may thus determine the eye pose of the eye 1002A with high accuracy. As will be described further below, in some embodiments the processing device 1026 may use the light intensity patterns to determine interfaces between physiological features of the eye 1002A. For example, an iris-to-pupil interface may be determined by the processing device 1026.

With reference again to FIG. 11, as discussed above, an example is illustrated of the positions of light detectors 1104A-1104D within a display system 1102 for determining eye pose. The light detectors 1104A-1104D may be, for example, photodiodes, phototransistors, photoresistors, or a combination thereof. The example representation is illustrated from a perspective of a user facing the display system 1102. For ease of reference, a user's eye 1002A is illustrated within the perspective. A plurality of light detectors 1104A-1104D are positioned about the user's eye 1002A. As mentioned herein, in some embodiments, light detectors 1104A-1104D may be attached to a frame of the display system 1102. For example, each of light detectors 1104A-1104D may be attached to a different portion of the frame surrounding an eyepiece. In other embodiments, light detectors 1104A-1104D may be attached to and/or embedded in a layer of material positioned adjacent to the eyepiece (e.g., a protective cover for the eyepiece) or the eyepiece itself. Light may be directed and scanned across the eye 1002A as described above. For example, a light pattern may be created using a diffractive grating positioned on, or otherwise adjustable by, a moveable reflector (e.g., a MEMS mirror).

Due to the different positions of the light detectors 1104A-110D, as the light pattern is scanned across the eye, each light detector will receive varying irradiance. In this way, each light detector may generate a distinct electrical current pattern. In some embodiments, the light detectors may generate a digital or analog signal associated with the received irradiance. For a given eye pose, each light detector will create a light intensity pattern which may represent a signature associated with the eye pose. As described above, with respect to FIGS. 10A-10B, measured light intensity patterns may thus be used to rapidly identify an eye pose.

The illustration includes four light detectors 1104A-1104D positioned equidistant apart in a rectangular pattern. However, it should be appreciated that different positions may be used. For example, light detectors 1104A-1104B may be positioned closer together. As described above, the display system 1102 may determine eye pose based on a machine learning model or stored information identifying known light intensity patterns. This information may be generated based on a similarly configured display system 1102. Thus, other positions of the light detectors 1104A-1104D may be used. For example, any positions for which the light detectors are able to receive reflected light may be used. In addition, the number of light detectors may total numbers other than four, as discussed herein. The machine learning model or stored information may be generated according to a particular configuration of light detectors. If the display system 1102 also uses this same configuration, then the display system 1102 may identify eye pose based on the machine learning model or stored information.

With reference now to FIG. 12, an example is illustrated of a flowchart of a process 1200 for determining an eye pose of a user's eye. For convenience, the process 1200 will be described as being performed by a display system having one or more processors (e.g., the display system 60, FIG. 9D).

At block 1202, the display system causes projection of a light pattern via a moveable reflector (e.g., a MEMS mirror). As illustrated in FIG. 10A, the display system may output light using a light source (e.g., a VCSEL). This outputted light may be provided to a moveable reflector, which may optionally have a diffractive grating on its reflective surface. The diffractive grating may cause a light pattern to be provided onto the user's eye. In some other embodiments, the moveable reflector is a specular reflector and the pattern may be formed upstream of the moveable reflector, e.g., at the output of the light source.

At block 1204, the display system adjusts the moveable reflector to scan the light pattern across the user's eye. The moveable reflector may be in a first position, such that the light pattern is projected at a first portion of the user's eye. For example, the light pattern may be projected at a leftmost portion of the user's eye. The display system may then cause adjustment of the moveable reflector to cause the light pattern to be projected along an axis. As described above, the axis may be a horizontal axis. The light pattern may additionally extend across a vertical portion of the user's eye. Additionally, the light pattern may optionally have a "V" shape formed by substantially continuous lines of light as illustrated in FIG. 10B.

In some embodiments, the light pattern may have a shape different from that of a "V" shape formed by substantially continuous lines of light. For example, and as illustrated in and will be discussed further regarding FIG. 15, a light pattern may comprise spots or dots instead of lines which form two portions (e.g., the "alpha" portion and "beta" portion as described above). As another example, and as illustrated in and will be discussed further regarding FIG. 16, a light pattern may encode an optical function. The optical function may increase light cone diffusion or decrease a spot size to better differentiate signals received by light detectors.

Optionally, the display system may initially scan the user's eye to find an interpupillary distance (IPD). The light projector may then be modulated so it illuminates only the IPD region during the scan. For example, the IPD region, and all margin required to project light onto a user's eye in any eye orientation, may be used. In this way, display system power may be reduced as certain users may have smaller IPD regions as compared to other users. Thus, the display system may conform the scan to each user.

With continued reference to FIG. 12, at block 1206, the display system obtains light intensity patterns from a threshold number of light detectors (e.g., photodiodes). As the moveable reflector causes the light pattern to be scanned across the user's eye, the light detectors may generate corresponding electrical current or a detector signal. This electrical current or detector signal may be represented as light intensity patterns as describe above.

At block 1208, the display system determines eye pose based on the obtained light intensity patterns. As described in FIG. 10B, the display system may use machine learning techniques to assign an eye pose to the light intensity patterns. The display system may also determine measures of similarity between the obtained light intensity patterns and known light intensity patterns. In some embodiments, the known light intensity patterns may be stored as tabular data in which electrical current is mapped against time or moveable reflector position. In some embodiments, the known light intensity patterns may be stored as information generated from analyzing the known light intensity patterns. For example, peaks, valleys, slopes, and so on, for the light pattern may be stored. In this example, and with respect to a "V" pattern, peaks and valleys for an "alpha" and "beta" portion may be stored along with corresponding positions of the moveable mirror.

In some embodiments, and as will be described further in FIGS. 18A-18D, the display system may determine an interface between different physiological portions of the eye. For example, the light intensity patterns may include information indicative of such interfaces. As a light pattern is scanned across an interface, there may be a corresponding change in electrical current or signal generated by one or more light detectors. An example interface may include an interface between an iris and pupil. The display system may identify this example interface based on differences in light absorption and reflectivity between the iris and pupil. For example, there may be greater light absorption and lower reflectivity in the pupil. In this example, resulting light intensity patterns may reflect a drop in electrical current or signal when the light pattern traverses from the iris to the pupil.

With respect to an iris/pupil interface, the display system may determine a size and/or position of the pupil. For example, the display system may determine a left-most interface and a right-most interface as represented in one or more light intensity patterns. The display system may then determine a size of the pupil based on a difference between the left-most interface and right-most interface. This determination may be based on the moveable reflector. For example, the display system may identify a distance from the left-most interface to the right-most interface along a horizontal axis based on a speed of rotation of the moveable reflector.

Example Eye Poses

Figure 13B:
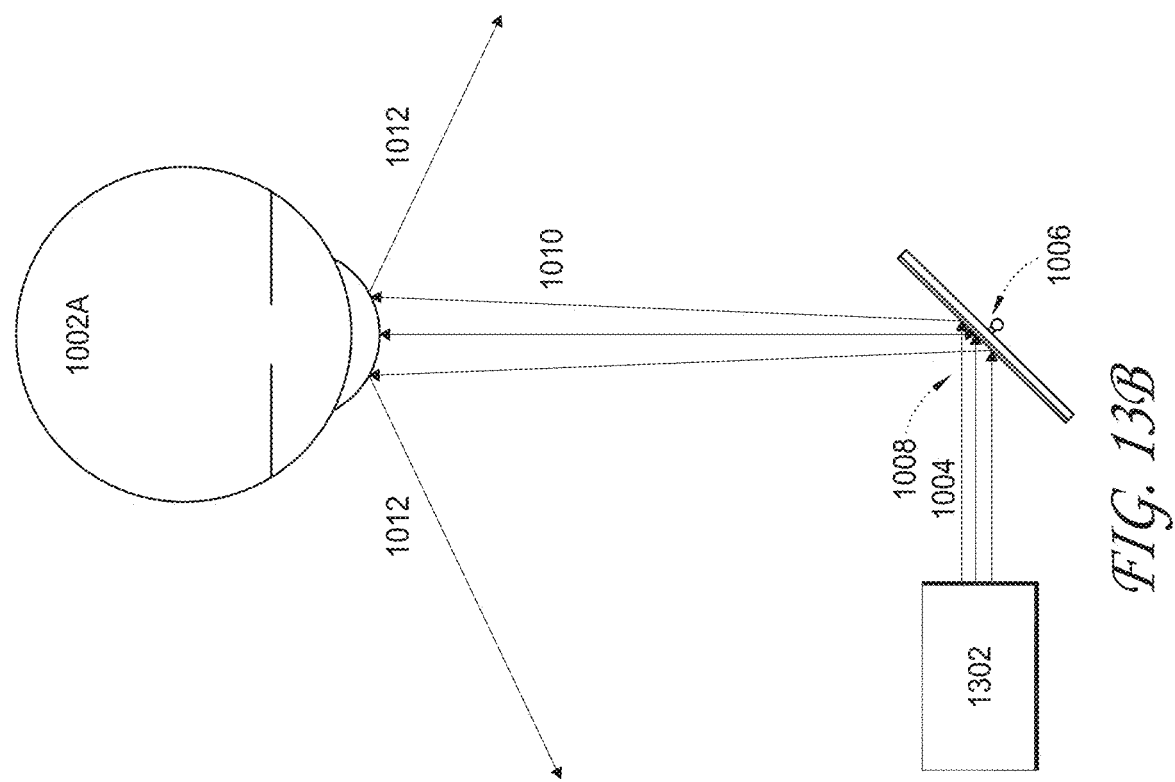
Figure 14A:
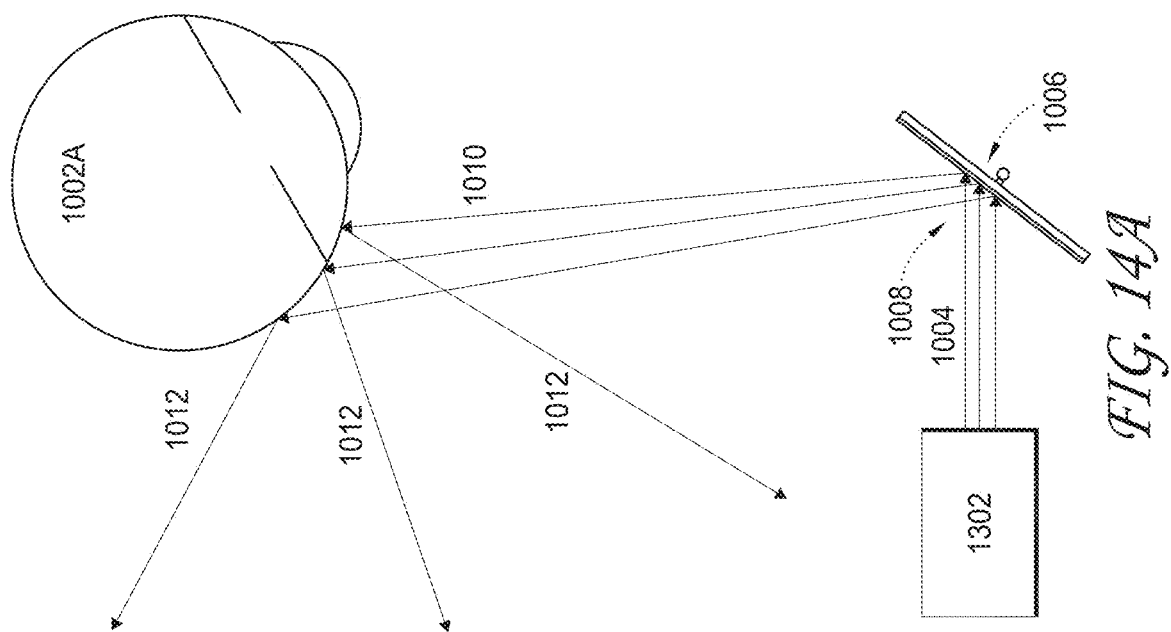

FIGS. 13A-13C illustrate a light pattern being scanned across a first eye pose of an eye. Similarly, FIGS. 14A-14C illustrate a light pattern being scanned across a second eye pose of an eye. As discussed herein, these different eye poses will cause different light intensity patterns to be generated.

FIGS. 13A-13C illustrate an example of a light pattern 1010 being projected onto and scanned across a user's eye 1002A. In the illustrated examples, the light source 1302 (e.g., a VCSEL diode) is projecting light 1004 on the moveable reflector 1006, which may optionally have a diffractive grating 1008. The resulting light pattern 1010 then propagates to the eye 1002A. As illustrated, a portion of the light of the light pattern is then reflected off the eye 1002A as reflected light 1012. As described above, light detectors (not shown) may be positioned about the eye 1002A to receive the reflected light 1012.

FIGS. 13A-13C thus illustrate the light pattern 1010 being scanned across the user's eye 1002A by adjusting the position of the moveable reflector 1006 (e.g., by rotating the moveable reflector 1006). It will be appreciated that the reflected light 1012 is reflected in different directions depending on the position of the moveable reflector 1006. Thus, the light detectors positioned about the eye 1002A may each generate a unique light intensity pattern. In this way, a display system may determine a specific eye pose corresponding to the eye pose illustrated in FIGS. 13A-13C.

For example, FIG. 13A illustrates the moveable reflector 1006 at an initial position. At this initial position, the light pattern 1010 is directed onto a corresponding initial position of the eye 1002A. For this eye pose, the initial position corresponds to a left portion of the eye 1002A. The reflected light 1012 for this initial position is illustrated as being reflected towards the left of the eye 1002A. This reflected light 1012 may be received by light detectors and electrical current or signal may be correspondingly generated.

In FIG. 13B, the moveable reflector 1006 has scanned the light pattern 1010 to a substantially central portion of the eye 1002A. In this example, the reflected light 1012 is being reflected towards both a left and right of the eye 1002A. Light detectors may, in some embodiments, be positioned about the eye 1002A (e.g., as illustrated in FIG. 11). Thus, light detectors positioned to the right of the eye 1002A may receive additional light as compared to light received in FIG. 13A.

In FIG. 13C, the moveable reflector 1006 has scanned the light pattern 1010 to a right portion of the eye 1002A. This right portion may correspond to a final position of the moveable reflector 1006. For this final position, reflected light 1012 is being reflected towards the right of the eye 1002A. Thus, the moveable reflector 1006 may scan the light pattern 1010 via adjusting from the initial position to the final position. In some embodiments, the moveable reflector 1006 may scan the light pattern 1010 by rotating about one or more axes. As mentioned herein, in some embodiments, the moveable reflector 1006 may scan the light pattern 1010 by rotating about a single axis. An amount of rotation may be based on physiological features of the eye 1002A. For example, the physiological features may include the sclera, cornea, pupil, and so on, and the amount of rotation may be based on a corresponding size (e.g., a length along a horizontal axis) of the feature.

Subsequently, the display system may obtain light intensity patterns reflecting the light pattern 1010 being scanned from the initial position to the final position. As described herein, these light intensity patterns may be used to determine the eye pose illustrated in FIGS. 13A-13C.

FIGS. 14A-14C illustrate another example of a light pattern 1010 being projected onto and scanned across a user's eye 1002A, with the user's eye 1002A in a different pose than the eye shown in FIGS. 13A-13C. In the illustrated eye pose, the center of the eye 1002A is angled towards the right of the figure.

In FIG. 14A, the moveable reflector 1006 is at an initial position. For this eye pose, the light pattern 1010 is being provided to a left portion of the eye. Since the illustrated eye pose is angled to the right as compared to the eye pose illustrated in FIGS. 13A-13C, the light pattern 1010 is being provided to a different portion of the eye 1002A. Thus, the reflected light 1012 is being reflected differently from the reflected light illustrated in FIG. 13A. Light detectors positioned about the eye 1002A will thus generate a different measure of electrical current or signal.

In FIG. 14B, the moveable reflector 1006 has adjusted to cause the light pattern 1010 to be scanned further across the eye 1002A along a horizontal axis. For this example eye pose, the light pattern 1010 is closer to a cornea of the eye 1002A. In contrast, the eye pose illustrated in FIG. 13B represents the eye 1002A looking straight ahead. Thus, in FIG. 13B the light pattern 1010 is being provided to a substantially central portion of the eye 1002A. In FIG. 14C, the moveable reflector 1006 has adjusted to a final position. As illustrated, the light pattern 1010 has been substantially scanned across the cornea of the eye 1002A.

It will be appreciated that the light pattern 1010 has been scanned across a different portion of the eye 1002A as compared to the eye illustrated in FIGS. 13A-13C. Thus, resulting light intensity patterns will be unique as compared to the light intensity patterns resulting from the scan illustrated in FIGS. 13A-13C. For some eye poses, the light pattern 1010 may be scanned across a substantially similar portion of the eye 1002A. For example, the light pattern 1010 may scan a similar portion of an eye looking straight forward and an eye looking down. However, these eyes will be in a different orientation such that physiological features of the eye will be in different orientations. For example, a cornea will be in a different orientation. Thus, the reflected light 1012 will result in generation of unique light intensity patterns. In this way, the display system may determine eye pose based on these light intensity patterns.

Example Light Patterns

Figure 15:
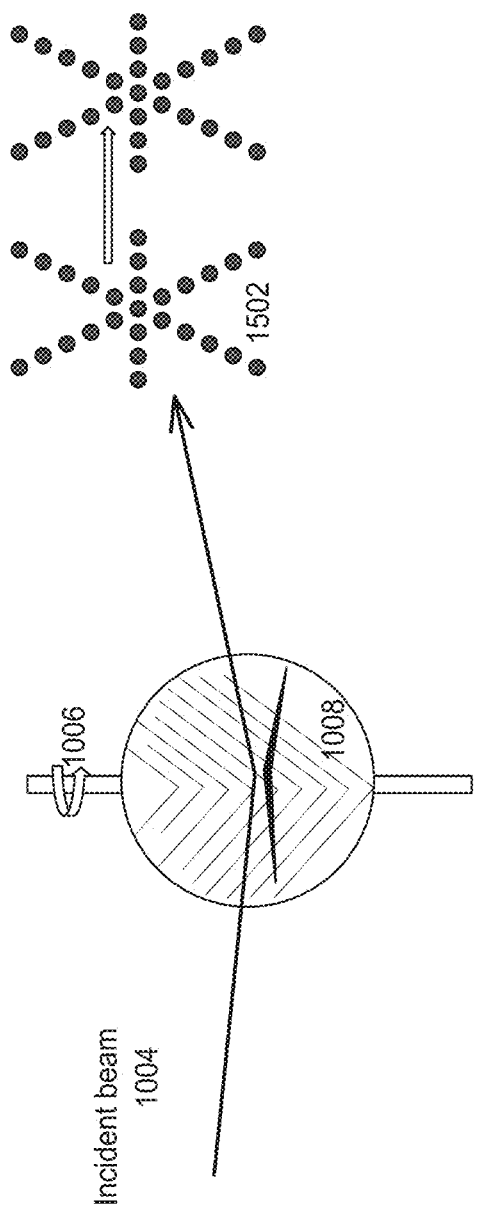
FIG. 15 illustrates an example of a light pattern for scanning across the user's eye.

FIG. 15 illustrates an example of a light pattern 1502 for scanning across the user's eye. In this example, the light pattern 1502 created by a diffractive grating 1008 is comprised of spots or dots of light, rather a continuous line of light. The light pattern 1502 may thus represent a pattern displacement which may be projected onto a user's eyes during adjustment of a moveable reflector (e.g., reflector 1006, FIG. 10). In some embodiments, multiple diffractive gratings with different pitches may be etched to superimpose different diffraction patterns, and thus create a "line" or points close enough to appear as a line.

Figure 16:
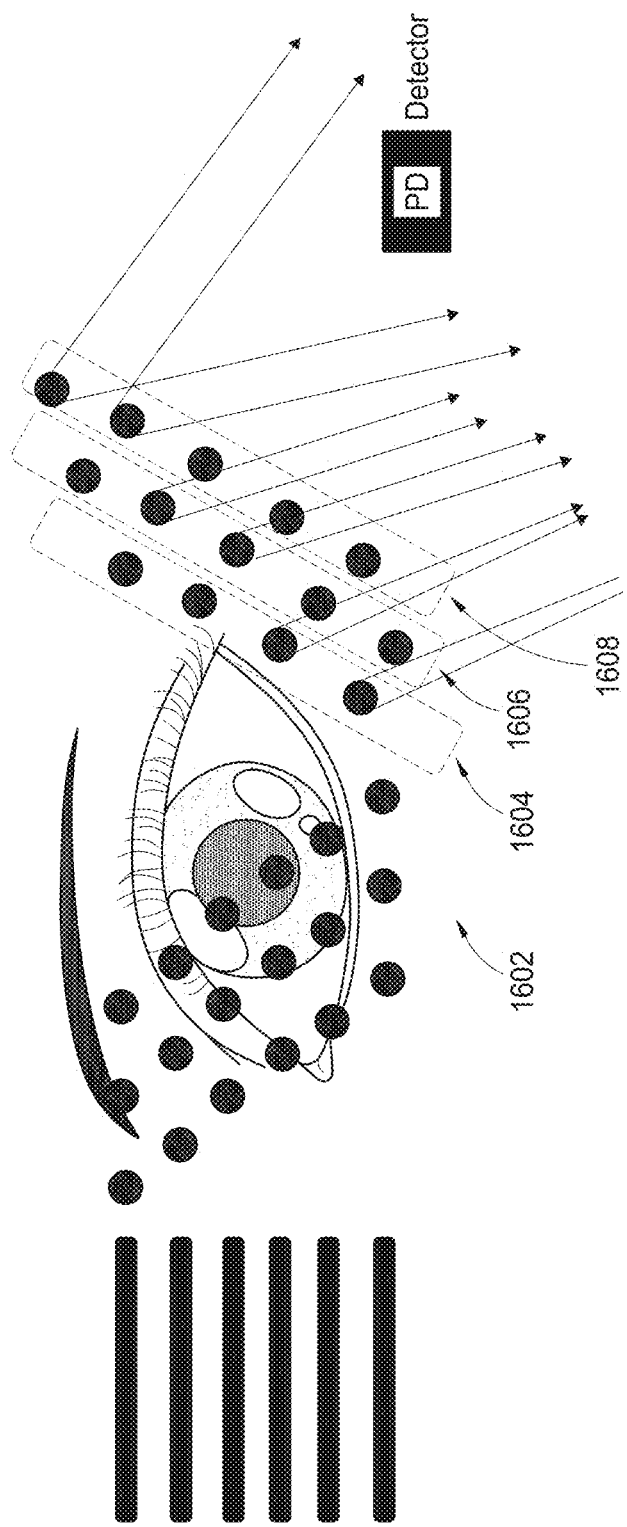
FIG. 16 illustrates another example of a light pattern for scanning across the user's eye.

FIG. 16 illustrates another example of a light pattern 1602 for scanning across the user's eye. In some embodiments, the light pattern 1602 may include multiple rows 1604, 1606, 1608 of light, which may be formed by different lines of light or spots of light forming individual rows. As illustrated, the rows 1604, 1606, 1608 may each define angles of less than 90° relative to the horizontal axis of the eye. To differentiate the reflected light signals provided by each of the rows 1604, 1606, 1608, the light forming the rows of light may have different properties. For example, light forming different ones of the rows 1604, 1606, 1608 may have different colors or wavelengths, different polarizations (e.g., where polarization sensitive light detectors are used), etc.

In some other embodiments, light forming different rows 1604, 1606, 1608 may have different associated optical functions. As an example, the optical function may increase light cone diffusion (e.g., may provide beams of diverging light). As another example, the optical function may decrease a spot size (e.g., provide converging beams of light), which may be advantageous for providing a high signal to noise ratio for a light detector. As yet another example, a row may be formed by beams of collimated light. In some embodiments, the desired levels of convergence, divergence, or collimation may be provided by a holographic material (e.g., surface or volume HOE) on the moveable reflector which provides both diffraction to formed the desired row pattern and a lens function (e.g., a collimation, focusing, or diverging lens function).

Two Light Sources

In some embodiments, two light sources (e.g., two VCSELs) may be used to determine an eye pose of an eye. Each light source may output light with different properties (e.g., different wavelengths or colors). With respect to the example of a "V" pattern, a first light source may be used to form a first portion (e.g., the "alpha" portion 1010A) and a second light source may be used to form a second portion (e.g., the "beta" portion 1010B) of a light pattern. Using two lights sources may provide example advantages, such as reducing cross-talk. For example, there may be no cross-talk between the "alpha" portion and the "beta" portion. As another example, the scan time may be reduced. For example, the moveable reflector (e.g., MEMS mirror 1006) may be required to perform less adjustment (e.g., rotation about one or more axes) to scan a user's eye.

FIG. 17A illustrates an example of a light pattern 1010 projected onto a user's eye using two light sources. In the left most portion of the illustration, the light pattern has the "alpha" portion 1010A of the light pattern 1010 being formed by the first light source. For example, the "beta" portion 1010B is not being projected by the second light source. A plurality of light detectors may thus measure reflected light while the "alpha" portion 1010A is being projected. Subsequently, and with respect to the right-most portion of the illustration, the "beta" portion 1010B is being projected onto the user's eye. In contrast, the "alpha" portion 1010A is not being directed onto the user's eye. The plurality of light detectors may thus measure reflected light while the "beta" portion 1010B is being directed onto the user's eye. In this way, cross-talk between these portions may be reduced or eliminated.

The display system may optionally generate two light intensity patterns for each light detector, one for the "alpha" portion 1010A and one for the "beta" portion 1010B. The display system may, as an example, store information identifying times and/or MEMS mirror positions at which either the "alpha" portion 1010A or "beta" portion 1010B were being projected. In some embodiments, the display system may generate a single light intensity pattern which is representative of both the "alpha" portion 1010A and the "beta" portion 1010B and the portions 1010A, 1010B may optionally be scanned simultaneously across the eye.

Figure 17B:
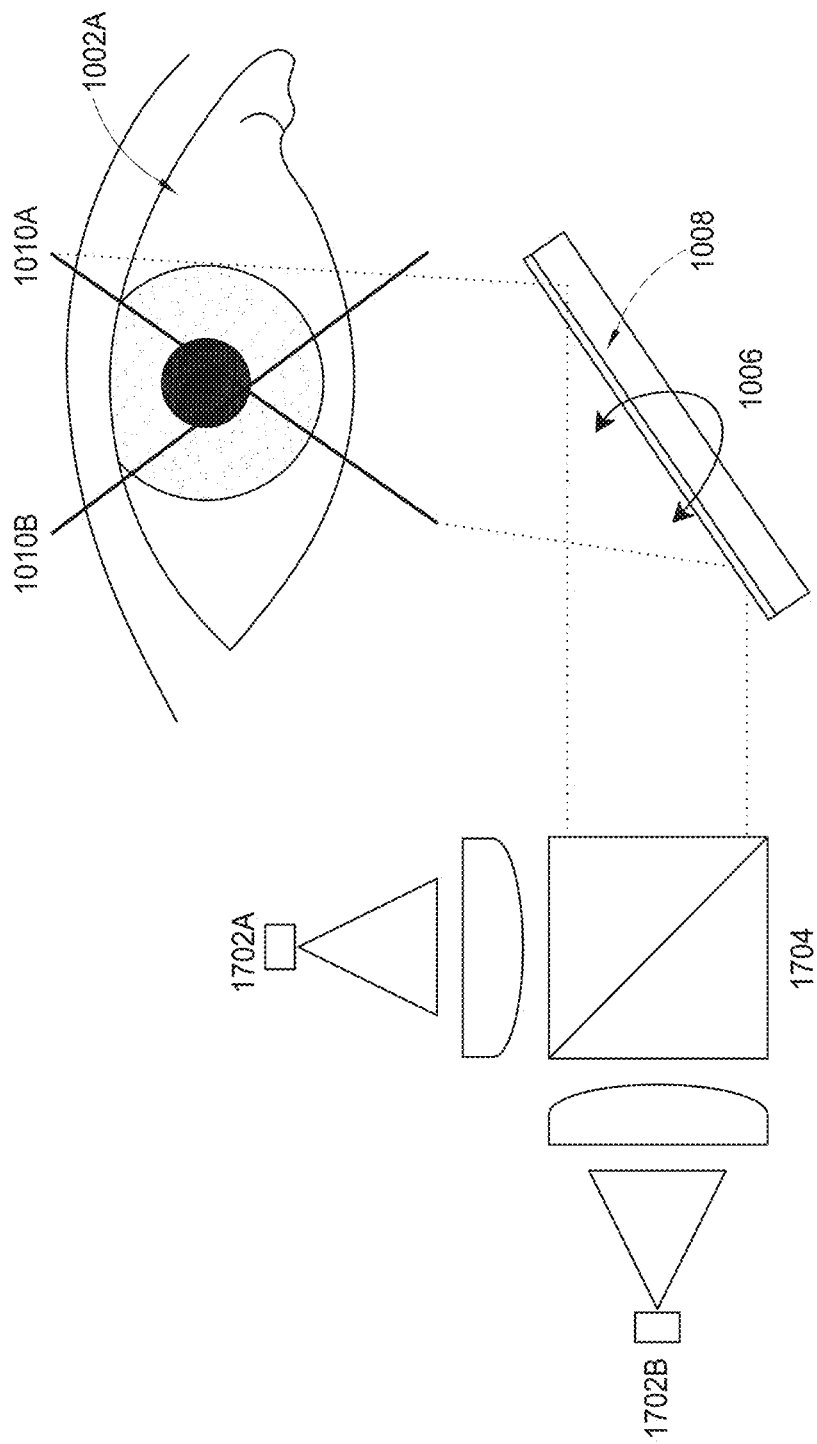

FIG. 17B illustrates an example block diagram illustrating using two lights sources 1702A, 1702B. In the illustrated example, light is provided to the moveable reflector 1006, which may optionally have a diffractive grating 1008 as discussed herein. In some embodiments, the moveable reflector 1006 may include a holographic element for generating the desired line of light (e.g., the hologram may be a multiplexed hologram, including one hologram selective for one wavelength for line "alpha" and another hologram selective for the wavelengths of light for line "beta"). In some other embodiments, the moveable reflector 1006 is a specular reflector and the desired pattern is formed at the light sources 1702A, 1702B. A combiner 1704 may be used to direct light from the light sources 1702A, 1702B to the moveable reflector 1006.

Figure 17C:
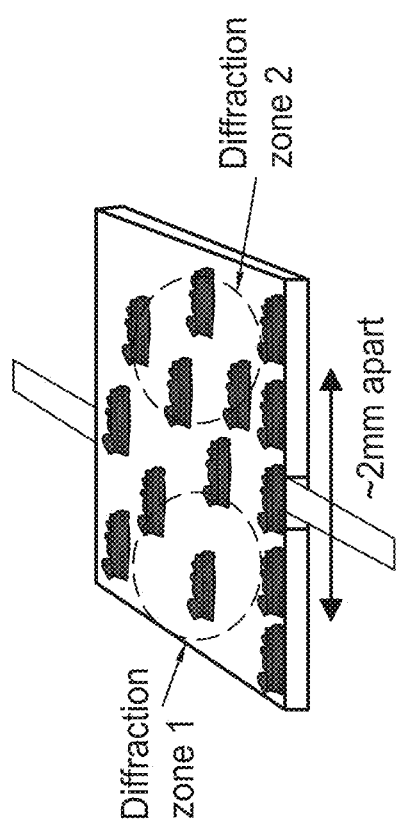

Another implementation may include having two areas on the moveable reflector 1006. For each of the areas there may be a specific diffraction grating, with each of the light sources being configured to illuminate one of the areas. Thus, different lines (e.g., "alpha" portion and "beta" portion) may be created. An example of such a diffractive grating with multiple diffraction zones is illustrated in FIG. 17C. Each diffraction zone may comprise differently configured diffraction gratings. For example, the diffraction gratings of the diffraction zones may have different physical parameters, including different periodicities and/or different sizes (e.g., heights and/or widths) for the individual structures (e.g., laterally-extending lines of material) forming the gratings.

Determining Size and/or Position of Physiological Features

It will be appreciated that the light intensity patterns may contain information that may be utilized to determine eye parameters other than pose. For example, the display system may be configured to use the light intensity patterns described herein to determine the sizes and/or positions of physiological features of a user's eye. Example physiological features may include a sclera, an iris, a pupil, an interface between the sclera and the iris, an interface between the iris and the pupil, and so on. The display system may determine size and/or position as an alternative to, or in addition to, determining eye pose.

With respect to an interface between the iris and pupil, the display system may determine its position based on a change in electrical current or signal as represented in one or more light intensity patterns. For example, the display system may identify a peak or valley (e.g., a change in derivative greater than a threshold). With respect to a pupil, the display system may determine its size based on identifying the boundaries of the pupil. The boundaries may, as an example, correspond to a left-most interface and a right-most interface between the pupil and the iris.

Figure 18A:
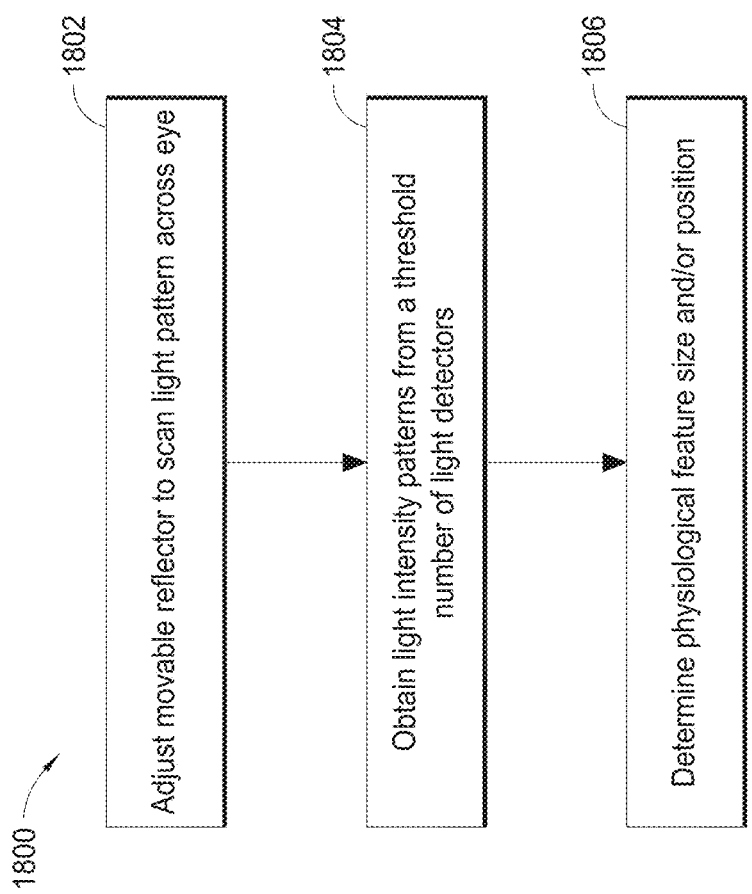
FIG. 18A illustrates an example flowchart of a process for determining physiological information associated with an eye.

FIG. 18A illustrates an example flowchart of a process 1800 for determining physiological information associated with an eye of a user. For convenience, the process 1800 will be described as being performed by a display system of one or more processors (e.g., display system 60).

At block 1802, and as described above with respect to block 1204 of FIG. 12, the display system adjusts a moveable reflector to scan a light pattern across the eye. At block 1804, the display system obtains light intensity patterns from a threshold number of light detectors, similar to block 1206 of FIG. 12. As described herein, the display system may obtain light intensity patterns which represent a measure of electrical current or signal generated by respective light detectors. Each light intensity pattern may map electrical current or signal to time and/or position of the moveable reflector.

At block 1806, the display system determines a size and/or position associated with a physiological feature of the eye. As discussed herein, in some embodiments, machine learning and/or pattern matching may be utilized to determine the locations of physiological features or boundaries, and sizes may be calculated from these determined locations.

Reference will now be made to FIGS. 18B-18D, which illustrate an example of determining size and/or position information associated with one or more physiological features.

FIG. 18B illustrates the light pattern 1010 being scanned across the eye 1002A. In the illustrated example, the light pattern has a "V" shape which may include an "alpha" 1010a portion and a "beta" portion 1010b. The "V" shape is described in more detail above with respect to at least FIGS. 10A-10B. An example light intensity pattern 1814 is illustrated, which indicates a measure of signal or current from a light detector receiving light reflected from the eye 1002A during the scan. The example light intensity pattern 1814 may be associated with one of a plurality of the light detectors positioned about the eye 1002A. An example of light detectors positioned about an eye is illustrated in FIG. 11.

At a time or moveable reflector position represented in FIG. 18B, the "alpha" portion 1010a of the light pattern 1010 is swept over at an interface, or boundary, 1812 between the sclera and the iris. As the light passes from the highly reflective white sclera to the darker, less reflective iris, this intersection 1812 may show a reduction in reflected light received by a light detector associated with the pattern 1814. The reflected light may result from diffusive reflections of the light pattern 1010, and the pattern 1814 may thus indicate a gradual reduction in intensity. The light intensity pattern 1814 therefore indicates this interface 1812 as a reduction in signal with respect to portion 1816 of the light intensity pattern 1814.

The display system may use the techniques described herein, such as a machine learning model or stored information, to determine that this reduction in signal corresponds to the physiological interface 1812 between the sclera and iris. For example, the display system may use a threshold number of light intensity patterns to effectuate the determination. The display system may then determine a position associated with this interface 1812. For example, the display system may identify a time mapped to portion 1816. In this example, the display system may determine the position based on a speed at which the moveable reflector adjusts. As another example, the display system may identify a moveable reflector position associated with portion 1816. Based on information identifying a position of the moveable reflector, the display system may determine a location at which the light pattern 1010 is incident and which is causing the portion 1816 of the light intensity pattern 1814.

FIG. 18C illustrates the light pattern 1010 being further scanned across the eye 1002A. The "alpha" portion 1010a, in this example, is swept pass an intersection 1822 between the iris and the pupil. Similar to the above, as the light passes from the more reflective iris to the darker, less reflective pupil, this this intersection may show a reduction in light reaching the light detector associated with the light intensity pattern 1814. Thus, a reduction in signal is indicated at portion 1824 of the light intensity pattern 1814. The display system may thus determine a position associated with this interface 1822 as described above.

FIG. 18D illustrates the light pattern 1010 being further scanned until the "alpha" portion 1010a is scanned across another interface 1832 between the pupil and the iris. This interface 1832 represents a right-most interface between the pupil and the iris. In contrast, the interface 1822 described in FIG. 18C represents a left-most interface between the pupil and the iris. Similar to the above, the display system may determine a position associated with this interface 1832. In the illustrated light intensity pattern 1814, however, a peak 1834 caused by a glint coincides with the interface 1832. It will be appreciated that the glint provides a large amount of reflected light (e.g., specularly reflected light) when the light pattern 1010 is scanned across the interface 1834, which may obscure the detection of the interface 1834 using the illustrated light intensity pattern 1814. However, as discussed herein, multiple light detectors providing multiple light intensity patterns are preferably utilized and at least some of these other light detectors would be expected to register a difference in reflected light intensity due to changes in reflectivity at the interface 1832. For example, these other light intensity patterns (not shown) may show the reverse of the portions 1824 and 1816 of the light intensity pattern 1814 and may be utilized to determine the location of the interface 1832.

Based on the interface 1822 illustrated in FIG. 18C and the interface 1832 illustrated in FIG. 18D, the display system may determine a size associated with the pupil. For example, the size may represent a size along a horizontal axis. In this example, the size may therefore represent a length of the pupil along the horizontal axis, e.g., a width or diameter of the pupil. The display system may additionally determine a position of the pupil. For example, the display system may calculate a centroid of the pupil (e.g., a midpoint of the pupil width) as determined based on interfaces 1822, 1832.

It will be appreciated that the interface or boundary between the iris and the sclera, and the size of the iris, may be determined as discussed above for the interface between the iris and the pupil and the size of the pupil. For example, the locations of the left and right interfaces of the iris may be determined based on the detected reduction in reflected light and the reflected light level being higher than the lower reflected light level of the pupil.

While the description above identified that the display system may determine an interface (e.g., interface 1812) prior to completion of a scan, in some embodiments the display system may determine the interfaces upon completion of the scan. For example, the display system may obtain light intensity patterns and determine size and/or position information based on the light intensity patterns. In this example, machine learning techniques may be leveraged. For example, one or more machine learning models may be trained to identify (e.g., label) physiological features based on light intensity patterns.

Estimating Eye Speed

In some embodiments, the display system may determine a velocity of a user's eye. For example, the display system may determine a speed of rotation. The speed of rotation may be used for disparate purposes by the display system, such as identifying the occurrence of a saccade or estimating an extent to which the eye will rotate during a saccade. As will be described, the display system may determine a speed of rotation (e.g., a saccadic velocity) based on comparing movement of one or more physiological features or differences between successive eye poses.

The display system may determine a speed of rotation based on a difference in successively determined eye poses. For example, at a first time the display system may perform a scan of a user's eye. In this example, the display system may associate a first eye pose determined based on the scan with this first time. At a second time, the display system may perform a subsequent scan of the user's eye. The display system may then associate a second eye pose with this second time. One or more measures of a difference in eye pose between the first eye pose and second eye pose may be determined. An example measure may include an adjustment of an optical or visual axis between the first eye pose and second pose. The display system may then determine the speed of rotation using the difference in the determined position of the optical or visual axis and the difference in time between the first time and second time.

The display system may also determine a speed of rotation based on movement of one or more physiological features. For example, at a first time the display system may determine a first position of a physiological feature (e.g., an interface between an iris and pupil). Subsequently, at a second time the display system may determine a second position of the physiological feature. An extent to which the physiological has feature moved, for example along one or more axes, may be identified. The display system may then determine speed of rotation based on the difference in the determined position of the physiological features and a difference between the first time and second time.

A saccade may be understood to represent a rapid movement of an eye between two or more phases of fixation. During the occurrence of a saccade, a user may have reduced visibility between two fixations. In some embodiments, the display system may adjust presentation of virtual content to leverage this reduced visibility. To identify the occurrence of a saccade, the display system may determine whether a speed of rotation of an eye exceeds a threshold. Due to the techniques described herein, the display system may advantageously scan the eye at a rate high enough to detect saccades (e.g., 1 kHz, 10 kHz, and so on). Thus, the occurrence of a saccade may be determined. This determination may be utilized to influence depth-plane switching in a multi-depth plane display, as discussed in, e.g., US Patent Application Publication No. 2017/0276948, published Sep. 28, 2017, the entirety of which is incorporated by reference herein.

Additionally, it will be understood that an extent to which an eye will rotate during a saccade may be based on an initial rotation speed (saccadic velocity) of the eye. For example, it will be understood that the initial saccadic velocity of an eye, the angle the eye is moving, and the final orientation of the eye after a saccade are correlated. Thus, the display system may estimate a final location at which the user will fixate upon completion of the saccade, if the initial velocity and direction are known.

It will be appreciated that different users may have different associated saccadic velocities. The display system may advantageously use machine learning techniques to generate a model associated with a particular user's saccadic velocity. For example, the display system may identify an initial speed and direction associated with a saccade. In this example, the display system may then identify an extent to which the eye rotated upon completion of the saccade (e.g., by constantly scanning the eye and determining pose as described herein). Based on this information, the display system may train, or otherwise update an existing, machine learning model. As an example, the machine learning model may learn an accurate correlation between saccadic velocity, direction, and the end point of a particular user's eye.

Being able to estimate this end point may allow the final after-saccade pose to be determined. As discussed herein, the display system may use this estimated pose in the presentation of virtual content to the user. In some embodiments, the estimated pose may be used to validate and/or determine a confidence level in the pose determined using the light-scanning and light intensity pattern-based techniques discussed herein.

Other Embodiments

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

It will also be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (140), the remote processing module (150), and remote data repository (160). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense. For example, while advantageously utilized with AR displays that provide images across multiple depth planes, the augmented reality content disclosed herein may also be displayed by systems that provide images on a single depth plane.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

What is claimed is:

1. A display system configured to present virtual content to a user, the display system comprising:
 a light source configured to output polychromatic light;
 a movable reflector configured to reflect the outputted polychromatic light to the eye of the user according to a scan pattern, wherein the scan pattern comprises:
  a first leg; and
  a second leg, wherein the first leg extends vertically in a first direction and the second leg extends vertically in a second direction, wherein the first direction crosses the second direction, and wherein the first and second legs are formed by light of different wavelengths;
 a plurality of light detectors configured to detect reflections of the light scanned across the eye; and
 one or more processors configured to perform operations comprising:
  causing adjustment of the orientation of the moveable reflector, such that the reflected light is scanned across the eye according to the scan pattern;
  obtaining respective light intensity patterns detected by the light detectors, wherein a light intensity pattern represents light detector signals determined at different times during scanning of the reflected light across the eye; and
  determining, based on the light intensity patterns, a speed of rotation of the eye.

2. The display system of claim 1, wherein determining the speed of rotation of the eye includes determining a saccadic velocity of the eye.

3. The display system of claim 2, wherein the operations further comprise predicting a pose of the eye based on the saccadic velocity.

4. The display system of claim 1, wherein the movable reflector comprises a diffractive grating, wherein the diffractive grating is configured to convert an incident beam of the polychromatic light from the light source into the scan pattern.

5. The display system of claim 1, wherein the movable reflector comprises a plurality of diffractive gratings, each diffractive grating configured to form a different light pattern for scanning across the eye.

6. The display system of claim 5, wherein the diffractive gratings are positioned on, or form part of, a MEMS mirror, and wherein the position information indicates an orientation of the MEMS mirror, the MEMS mirror being adjustable by the display system.

7. The display system of claim 1, wherein the light detectors are photodiodes, and wherein each light intensity pattern represents a plot of electrical current versus position information associated with a position of the movable reflector.

8. The display system of claim 1, wherein the light source is one of two light sources configured to output light to the movable reflector, wherein each of the light sources is configured to form a respective portion of the scan pattern of the light for scanning across the eye.

9. The display system of claim 1, further comprising a waveguide, wherein the waveguide is one of a stack of waveguides, wherein some waveguides of the stack have out-coupling optical elements configured to output light with different amounts of wavefront divergence than out-coupling optical element of other waveguides of the stack, wherein the different amounts of wavefront divergence correspond to different depth planes.

10. The display system of claim 1, wherein determining the speed of rotation of the eye is based on a difference between successively determined eye poses of the eye that are determined based on at least two successive scans of the eye using the scan pattern.

11. The display system of claim 1, wherein determining the speed of rotation of the eye is based on a movement of one or more physiological features of the eye that is detected based on at least two successive scans of the eye using the scan pattern.

12. A method implemented by a display system configured to present virtual content to a user, wherein the method comprises:
 controlling a movable reflector to direct light onto an eye of the user according to a scan pattern comprising:
  a first leg; and
  a second leg, wherein the first leg extends vertically in a first direction and the second leg extends vertically in a second direction, wherein the first direction crosses the second direction, and wherein the first and second legs are formed by light of different wavelengths;
 obtaining a plurality of light intensity patterns representing light detector signals at different times, the light detector signals obtained from respective light detectors during the directing of the light onto the eye according to the scan pattern; and
 determining, based on the light intensity patterns, a speed of rotation of the eye.

13. The method of claim 12, wherein determining the speed of rotation of the eye includes determining a saccadic velocity of the eye.

14. The method of claim 13, wherein the operations further comprise predicting a pose of the eye based on the saccadic velocity.

15. The method of claim 12, wherein directing the light onto the eye according to the scan pattern comprises moving the moveable reflector such that the scan pattern is moved from a first portion of the eye to a second portion of the eye along an axis.

16. The method of claim 15, wherein the movable reflector comprises a diffractive grating, wherein the diffractive grating is configured to convert an incident beam of light from a light source into the scan pattern.

17. The method of claim 12, wherein determining the speed of rotation of the eye comprises:
employing at least one machine learning technique to generate a machine learning model associated with a saccadic velocity of the eye.

18. The method of claim 12, wherein determining the speed of rotation of the eye is based on a difference of a position of at least one physiological characteristic of the eye that is determined based on at least two successive scans of the eye using the scan pattern, and wherein determining the at least one physiological characteristic comprises:
accessing information identifying stored light intensity patterns, the stored light intensity patterns being associated with respective physiological characteristics; and
determining the at least one physiological characteristic based at least partly on comparing the obtained light intensity patterns with the stored light intensity patterns.

19. The method of claim 18, wherein comparing the obtained light intensity patterns with the stored light intensity patterns includes comparing positions of one or more features in the light intensity patterns, wherein the one or more features include at least one of a peak or a valley.

20. Non-transitory computer storage media storing instructions that when executed by one or more processors, cause the one or more processors to perform operations comprising:
controlling a movable reflector to direct light onto an eye of the user according to a scan pattern comprising:
a first leg; and
a second leg, wherein the first leg extends vertically in a first direction and the second leg extends vertically in a second direction, wherein the first direction crosses the second direction, and wherein the first and second legs are formed by light of different wavelengths;
obtaining a plurality of light intensity patterns representing light detector signals at different times, the light detector signals obtained from respective light detectors during the directing of the light onto the eye according to the scan pattern; and
determining, based on the light intensity patterns, a speed of rotation of the eye.

\* \* \* \* \*